United States Patent
Aramaki et al.

(10) Patent No.: US 6,618,760 B1
(45) Date of Patent: Sep. 9, 2003

(54) FORWARDING INFORMATION RETRIEVAL TECHNIQUE

(75) Inventors: Toshiya Aramaki, Tokyo (JP); Tsugio Okamoto, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/549,707

(22) Filed: Apr. 14, 2000

(30) Foreign Application Priority Data

Apr. 16, 1999 (JP) .......................................... 11/110041

(51) Int. Cl.[7] ............................................ G06F 15/173
(52) U.S. Cl. ...................... 709/240; 709/238; 709/241
(58) Field of Search ................................ 709/238, 239, 709/240, 241, 242

(56) References Cited

U.S. PATENT DOCUMENTS

| | | | |
|---|---|---|---|
| 5,479,401 A | 12/1995 | Bitz et al. | 370/60.1 |
| 6,011,795 A | * 1/2000 | Varghese et al. | 370/392 |
| 6,141,738 A | * 10/2000 | Munter et al. | 370/392 |
| 6,304,912 B1 | * 10/2001 | Oguchi et al. | 709/238 |
| 6,434,144 B1 | * 8/2002 | Romanov | 370/392 |

FOREIGN PATENT DOCUMENTS

| JP | 10257066 A | * 9/1998 | H04L/12/28 |
|---|---|---|---|
| WO | WO 9966681 A1 | * 12/1999 | H04L/12/56 |

OTHER PUBLICATIONS

Srinivasan et al., "Fast Address Lookups Using Controlled Prefix Expansion", *ACM Transactions on Computer Systems*, vol. 17, No. 1, Feb. 1999, pp. 1–40.

* cited by examiner

Primary Examiner—Glenton B. Burgess
Assistant Examiner—Mareisha N. Winters
(74) Attorney, Agent, or Firm—Sughrue Mion, PLLC

(57) ABSTRACT

An improved method for retrieving next forwarding destination of a received data signal is disclosed. First, a plurality of first tables and a second table are stored in the retrieval table. The first tables are hierarchically arranged according to division of the destination address, an entry of each of the first tables including a second-table pointer indicating a next accessed second entry of the second table. The second table serves as an index table of the first tables. Each of entries of the second table includes a hop pointer and a first-table pointer indicating a next accessed first table. The second table and a selected one of the first tables are alternately accessed depending on a first-table pointer included in an accessed entry of the second table while retrieving an entry of an accessed first table using a corresponding divisional portion of the destination address. A hop pointer is read from a finally accessed entry of the second table as a retrieval result.

25 Claims, 15 Drawing Sheets

FIG.8

| (OFFSET ADDRESS) | 1st TABLE 11 (BIT-0 FIRST TABLE) |
|---|---|
| 0(000 0000) | 2nd TABLE POINTER FOR R1 |
| 1(000 0001) | 2nd TABLE POINTER FOR R1 |
| ⋮ | |
| 62(011 1110) | 2nd TABLE POINTER FOR R1 |
| 63(011 1111) | 2nd TABLE POINTER FOR R1 |
| 64(100 0000) | 2nd TABLE POINTER FOR R2 |
| 65(100 0001) | 2nd TABLE POINTER FOR R2 |
| ⋮ | |
| 126(111 1110) | 2nd TABLE POINTER FOR R2 |
| 127(111 1111) | 2nd TABLE POINTER FOR R2 |

2a: HEAD POINTER FIELD
21: CONTINUATION/END FLAG FIELD
22: UPDATE FLAG FIELD
23: HOP POINTER FIELD
24: BIT-0 TABLE TYPE FLAG FIELD
25: BIT-0 FIRST TABLE POINTER FIELD
26: REGISTERED ADDRESS AND PREFIX LENGTH FIELD
    FOR BIT-0 ONE-ENTRY FIRST TABLE
27: BIT-1 TABLE TYPE FLAG FIELD
28: BIT-1 FIRST TABLE POINTER FIELD
29: REGISTERED ADDRESS AND PREFIX LENGTH
    FIELD FOR BIT-1 ONE-ENTRY FIRST TABLE

FORWARDING INFORMATION RETRIEVAL TECHNIQUE

BACKGROUND OF THE INVENTION

1. Field of the Invention

The present invention relates to a technique for determining a next forwarding destination of a data signal composed of a sequence of bits such as an IP (Internet protocol) packet on the basis of a destination address included in the data signal such as an IP address.

2. Description of the Related Art

There has been a router, which is a retrieval device for retrieving route information indicating the outgoing link to be used to forward an incoming data signal such as an IP packet to a communication network. Provided with a data signal, the router retrieves route information from a retrieval table and places the data signal into an appropriate outgoing queue depending on the retrieved route information.

In general, the retrieval table registers an "output interface" or an "IP address of a router as the next transit destination", which is the next forwarding destination of an incoming IP packet signal and is associated with an "IP sub-net address' and a "prefix length" included in the IP packet signal.

The router retrieves route information from the retrieval table by using an IP address indicating the ultimate destination of the incoming IP packet signal as a retrieval key, and determines a forwarding destination such as "output interface". In this retrieval, the router uses the longest matching method to determine an IP sub-net address which is a best match with the IP address of the incoming IP packet among IP sub-net addresses registered in the retrieval table.

Here, the longest matching method will be described briefly. In the longest matching method among the registered IP addresses, one having the longest significant bit string matching with the IP address of the retrieval key is selected. For example, it is assumed that two IP addresses "0**" and "00*" have been registered as IP addresses each being 3 bits in bit length.

As for "0," only the head bit "0" has an effective bit value. Each of the second and subsequent bits "" represents an arbitrary value of "0" or "1". As for "00*," the first and second bits "00" are effective bit values, and the third bit "*" represents an arbitrary value of "0" or "1". Hereinafter, the length of an significant bit string of an address in bit-count representation is referred to as prefix length (significant bit string length).

The IP address which indicates the ultimate destination of the outgoing IP packet and is used as the retrieval key is compared with two registered IP addresses. If the IP address of the retrieval key is "0001 . . . ", "00*" is longer than "0**" in prefix length matching the registered IP address. In this case, therefore, "00*" is selected as the IP address of the next forwarding destination.

In the case where the number of bits of the IP address is as short as 3 bits as in the above-described example, its retrieval is also easy. However, the number of bits of actually used IP address is far greater than the above example. For example, the address length defined in the standards IPv4 (Internet Protocol, version 4) is 32 bits. Further, in IPv6 (Internet Protocol, version 6) standardized in recent years, the address length becomes as long as 128 bits. In the data signal transit processing in the router, therefore, efficiency improvement of the search processing becomes important.

There have been proposed various methods of retrieving the next forwarding destination of an IP packet on the basis of the IP address included in the IP packet signal with improved efficiency of searching.

First, a binary tree retrieval method will now be described briefly by referring to FIG. 1.

FIG. 1 is a concept diagram showing a binary tree retrieval method. In the example as shown in FIG. 1, registered IP addresses P1 to P8 are formed in tree structure in the binary tree retrieval method, bit values of a bit string are successively compared by taking a bit as a unit. As shown in FIG. 1, therefore, nodes forming the tree correspond to bit values of the bit string. respectively.

In the binary tree retrieval method, however, an increase in the number of entries causes a rapid increase in the number of nodes. As a result, the number of retrieval times also increases rapidly. As a retrieval method capable of suppressing the increase of the number of retrieval times caused by the increases of nodes, therefore, a radix tree retrieval method has been proposed.

The radix tree retrieval method will now be described simply by referring to FIG. 2. In the example as shown in FIG. 2, registered IP addresses P1 to P8 are formed in a tree structure. Unlike the binary tree retrieval method, it is not necessary to dispose nodes of the tree structure by taking a bit as a unit, in the radix tree retrieval method. Therefore, the number of nodes in the radix tree retrieval method is suppressed to twice the number of entries (the number of registered IP addresses) at most.

In the radix tree retrieval method, "0" and "1" of a branch of the tree structure does not directly represent bit values of a bit string. In each node, therefore, it is necessary to compare the entry of the node with the retrieval key.

Further, in the radix tree retrieval method, the number of retrieval times varies according to the. distribution of bits of a registered IP address. And the maximum number of retrieval times becomes, the same as the number of bits of a bit string in some cases. For example. in IPv4 in which the number of assigned bits is 32, the number of retrieval times may be 32.

Therefore, an example of a retrieval method capable of further suppressing the increase of the number of retrieval times caused by an increase of nodes has been proposed as a controlled prefix expansion retrieval method (hereafter simply referred to as "expansion method") in Reference 1: "ACM SIGMETRICS" 98 pp. 1 to 10. June 1998". A retrieve method similar to this expansion method is disclosed in Reference 2: Japanese Patent Application Laid-Open Publication No. 10-257066.

The conventional expansion method will now be described by referring to FIG. 3. In the conventional expansion method, the bit string of an IP address is divided into a plurality of divisional bit strings, and retrieval tables ("control tables" in the Reference 2) are provided for respective hierarchical divisional bit strings. In each retrieval table, each divisional bit string is used as an entry address.

In the example as shown in FIG. 3, a bit string having a total of 7 bits is successively divided into three divisional bit strings which have 2 bits, 3 bits and 2 bits, respectively. In retrieval tables at first and third stages, four divisional bit strings "00" to "11" are used as the entry addresses. In a retrieval table at a second stage, eight divisional bit strings "000" to "111" are used as entry addresses.

When updating the registered addresses in the expansion method, a retrieval end/continuation flag, a next table pointer indicating the IP address of a next forwarding destination, and transmission interface information itself are set in all registrable entries among entries of the retrieval table.

In other words, when registering an IP address, a bit string of an entry shorter than the bit length of each divisional bit string in each retrieval table is expanded to the end of the divisional bit string. By expanding the bit string, a plurality of entries sharing the bit string before expansion are caused to correspond commonly to the registered IP address.

In the example shown in FIG. 3, each of registered IP addresses P1 to P8 is expanded to the least significant bit of each divisional bit string. For example, the IP address "0*" indicated by P5 having a prefix length of 1 is expanded by 1 bit, and become "00" and "01" each having a length of 2 bits. And in the retrieval table of the first stage, P5 is registered in both entries which have entry addresses "00" and "01", respectively.

In the case where the IP address "111*" of P2 having a prefix length of "3" is expanded by 2 bits, the IP address "111*" of P2 become sour entries "11100," "11101," "11110," and "11111" each having a length of 5 bits. And in the retrieval table at the second stage, a divisional bit string of the third to fifth bits becomes an entry address. In four entries of entry addresses "100," "101," "110," and "111," therefore, P2 is registered. In addition, other registered IP addresses are expanded in the same way, and registering is conducted.

By expanding the bit strings, registered IP addresses can thus be associated with specific entry addresses of retrieval tables. In retrieval of the retrieval table at each stage, therefore, a divisional bit string of a registered IP address as it is can be used as an offset.

Therefore, the comparison with an entry in each node required in the radix tree retrieval becomes unnecessary. And the number of retrieval times is equal to the number of stages of the retrieval tables at most. For example, in the example of FIG. 3, the respective retrieval tables at three stages are provided and consequently the number of retrieval times is three at most. By using the expansion method, therefore, the number of retrieval times can be reduced significantly.

Further, if an IP address corresponding to the IP address of the retrieval key is not yet registered, then it is also possible to register the IP address of the retrieval key in the retrieval table.

It is now assumed that a 32-bit IP address is divided into four divisional bit strings each having 8 bits. How to register an IP address by using the expansion method in this case will now be described by referring to FIGS. 4 and 5.

FIG. 4 shows a procedure for registering an IP address in the case where the IP address to be registered has a prefix length of 8 bits or less. In this case, registration is conducted only for the retrieval table at the first stage (first control table). In registering such a range of entries of the first control that the IP address can be registered therein is first determined (step S1 of FIG. 4).

For example, the case where an IP address to be registered is "8. 0. 0. 0" having a prefix length "1" will now be described. Among bit strings of entry address, all divisional bit strings of eight upper bits having "1" in the first bit indicate the registrable range in this case. In other words, entries ranging from "128 (=1000 0000). 0. 0. 0" to "255 (=1111 1111). 0. 0. 0" become the registrable range.

For example, the case where an IP address to be registered is "8. 0. 0. 0" having a prefix length "2" will now be described. Among bit strings of entry address, all divisional bit strings of eight upper bits having "10" in first and second bits indicate the registrable range in this case. In other words, entries ranging from "128 (=1000 0000). 0. 0. 0" to "191 (=1011 1111). 0. 0. 0" become the registrable range.

With respect to the registrable range, update control is conducted (S2 of FIG. 4), More specifically, if an entry having an IP address already registered is not included in entries in the registrable range determined at the step S1, then entries in the range are updated to new IP addresses, the transmission interface is also updated, and then the registration is finished.

If an entry having an IP address already registered is included in the range, then the prefix length of the already registered IP address is first compared with the prefix length of an IP address to be newly registered. If the prefix length of the already registered IP address is equal to or longer than the new prefix length, then the already registered contents are made intact and the registration is finished.

On the other hand, if the prefix length of the already registered IP address is shorter than the new prefix length then contents of entries in the range are updated to information of the IP address to be newly registered, the transmission interface is also updated, and the registration is finished.

FIG. 5 shows a procedure for registering an IP address in the case where the prefix length of an IP address to be registered is longer than 8 bits and is not longer than 16 bits in 32 bits. In this case, the registration is performed only for the retrieval table at the first stage (first control table) and the retrieval table at the second stage (second control table).

In registering, retrieval is first conducted in the first control table by using the divisional bit string value of eight upper bits (step S1 of FIG. 5), which is the same way as the step S1 of FIG. 4.

It is then determined whether an already registered entry is included in the pertinent bits of the first control table (step S2 of FIG. 5).

If an already registered entry is included, then the second control table Indicated by the already registered entry is accessed (step S3 of FIG. 5).

On the other hand, If an already registered entry is not included, then a new second control table is selected and set according to a new next table pointer (step S4 of FIG. 5). In succession, the new second control table is accessed (step S5 of FIG. 5).

In the second control table, a registrable range is determined (step S6 of FIG. 5) in the same way as the step S1 of FIG. 4. Subsequently, update control is conducted for the registrable range (step S7 of FIG. 5) in the same way as the step S2 of FIG. 4, and the registration is finished.

In the conventional expansion method, if new required information to be sent to the next forwarding destination is added, then the added information itself. In addition to information such as transmission interface, is set in every registrable entry.

Also in the case where the prefix length of an IP address to be registered is longer than 16 bits and not longer than 24 bits, and in the case where the prefix length of the IP address to be registered is longer than 24 bits and not longer than 32 bits, entry setting can be performed in the same way.

Also in the case where an already registered IP address is to be deleted, information such as the transmission interface registered in all pertinent entries of the retrieval table is deleted in the same way as the case of addition.

In the above-described expansion method, however, there has been a problem such that changes of registered address (including addition, updating, and deletion) become complicated because the retrieval tables are divided into a plurality of stages and one registered address is registered in a plurality of entries by means of expansion of bit strings.

In other words, typically in the conventional expansion method, contents of a plurality of entries must be changed in order to register or delete one IP address. For example, for deleting the registration of the registered address "P2" in the example shown in FIG. 3, the registered address "P2" must be deleted in the four entries "100," "101," "110," and "111" of the retrieval table at the second stage.

If a retrieval table at a stage corresponding to the IP address to be newly registered is not present, then a retrieval table at one stage must be purposely added in the expansion method in order to register one IP address. In addition, it also becomes necessary to write the same registered information such as the transmission interface into each of the pertinent entries of the retrieval table.

Further, according to the conventional expansion method, a plurality of retrieval tables are provided in the second and subsequent stages so as to individually correspond to the registered entries of a retrieval table at the immediately preceding stage. As a result, a large number of retrieval tables are needed. Accordingly, the capacity of a memory for storing the retrieval tables becomes large.

In addition, in the conventional expansion method, it is necessary to form a retrieval table at one stage even if the retrieval table has only one entry having a destination address registered therein. Therefore, the conventional expansion method has a problem that the memory capacity is wasted.

In order to save the memory capacity, it is conceivable to provide each retrieval table with a variable length according to the number of entries. If the retrieval tables are made variable, however, then it becomes difficult to manage and control the retrieval tables and, in particular, it becomes difficult to implement the retrieval tables by using hardware.

SUMMARY OF THE INVENTION

The present invention has been made in order to solve the problems as described above.

An object of the present invention is to provide a forwarding information retrieval method and apparatus allowing memory capacity saving and easy change of registered addresses.

According to the present invention, an improved method for retrieving a hop pointer from a retrieval table using a destination address of a received data signal as a retrieval key to determine a next forwarding destination of the received data signal is provided. First, a plurality of first tables and a second table are stored in the retrieval table. The first tables are hierarchically arranged according to division of the destination address, an entry of each of the first tables including a second-table pointer indicating a next accessed second entry of the second table. The second table serves as an index table of the first tables, wherein each of entries of the second table includes a hop pointer and a first-table pointer indicating a next accessed first table. The second table and a selected one of the first tables are alternately accessed depending on a first-table pointer included in an accessed entry of the second table while retrieving an entry of an accessed first table using a corresponding divisional portion of the destination address. In this manner, a hop pointer is read from a finally accessed entry of the second table as a retrieval result.

As described above, hop pointers each indicating next forwarding destinations are stored only in the second table and the first tables have only second table pointers as entries. Therefore, the memory capacity forming an enormous number of first tables can be dramatically reduced as compared with the memory capacity of an individual retrieval table. In other words, the memory capacity of the retrieval tables can be saved as a whole.

Further, in the present invention, hop pointers are stored only in the second table serving as an index. In alteration of a registered address, therefore, it is sufficient to change only the second table pointer regarding an enormous number of pertinent entries of the first tables Alteration of information concerning the forwarding destination, such as the hop pointer can be conducted only in the second table. In the present invention, therefore, registered address alteration can be conducted easily.

According to an aspect of the present invention, a method for retrieving a hop pointer from a retrieval table using a destination address of a received data signal as a retrieval key to determine a next forwarding destination of the received data signal, the hop pointer indicating a registered address of the next forwarding destination, the method comprising the steps of:

a) providing a plurality of first tables T1_i (i is a positive integer) and a second table T2 in the retrieval table, wherein the plurality of first tables are hierarchically divided into a plurality of stages S(j) (j is a positive integer) corresponding to a sequence of divisional bit strings obtained by sequentially dividing a predetermined bit length of the destination address in decreasing order of significance, each of the first tables containing at least one first entry E1_k (k is a positive integer) each having a different offset address numbered based on a corresponding divisional bit string, wherein a first entry having an offset address matching a bit string portion of a registered address corresponding to a stage of each of the first tables includes a second-table pointer wherein the second table has a plurality of second entries E2_m (m is a positive integer), each of which includes a retrieval control flag, a first-table pointer, and a hop pointer, wherein one of the second entries is indicated by a second-table pointer of the first table, wherein the first-table pointer indicates a first table of a stage S(j+1) following a current stage S(j):

b) dividing the destination address into a plurality of destination divisional bit strings DST(j) each corresponding to the stages S(j);

c) accessing a first table T1_1 of the stage S(1) to retrieve a first entry E1_1 using a high-order destination divisional bit string DST(1) corresponding to the stage S(1) as a retrieval key, wherein the first entry E1_1 has an offset address matching the high-order destination divisional bit string DST(1);

d) accessing a second entry E2_1 of the second table T2 according to a second-table pointer included in the first entry E1_1;

e) when a retrieval control flag included in a second entry E2_m indicates continuation of retrieval, accessing a first table T1_i indicated by a first-table pointer included in the second entry E2_m to retrieve a first entry E1_k from the first table T1_i using a destination divisional bit string of a stage corresponding to the first table T1_i as a retrieval key, wherein the first entry E1_k has an offset address matching the destination divisional bit string of a stage corresponding to the first table T1_i;

f) accessing another second entry E2_m of the second table T2 according to a second-table pointer included in the retrieved first entry E1_k:

g) repeating the steps (a) and (f) when a retrieval control flag included in a second entry E2_m indicates continuation of retrieval; and h) when a retrieval control flag included in a second entry E2_m indicates termination of retrieval, reading a hop pointer included in the second entry E2_m as a retrieval result to terminate the retrieval.

Each of the second entries of the second table may further include an update flag indicating whether a hop pointer is updated. An initial hop pointer is stored in a variable. In the step (f), when an update flag included in the second entry E2_m indicates updating of a hop pointer, updating the variable to a hop pointer included in the second entry E2_m. In the step (h), when a retrieval control flag included in the second entry E2_m indicates termination of retrieval, reading a hop pointer from the variable as a retrieval result to terminate the retrieval.

According to another aspect of the present invention, the plurality of first tables are hierarchically divided into a plurality of stages S(j) (j is a positive integer) corresponding to a sequence of divisional bit strings obtained by sequentially dividing a predetermined bit length of the destination address in decreasing order of significance, each of the first tables containing at least one first entry E1_k (k is a positive integer) each having a different offset address numbered based on a corresponding divisional bit string, wherein a second-table pointer is included in a first entry which has an offset address matching a bit string portion of a registered address corresponding to a stage of each of the first tables when updating a hop pointer is needed, and wherein a first-table pointer indicating a first table of a stage S(j+1) following a current stage S(j) is included in a first entry which has an offset address matching a bit string portion of a registered address corresponding to a stage of each of the first tables when updating a hop pointer is not needed. The second table has a plurality of second entries E2_m (m is a positive integer), each of which includes a retrieval control flag, a first-table pointer, and a hop pointer, wherein one of the second entries is indicated by a second-table pointer of the first table, wherein the first-table pointer indicates a first table of a stage S(j+1) following a current stage S(j). The method includes the steps of: b) dividing the destination address into a plurality of destination divisional bit strings DST(j) each corresponding to the stages S(j); c) accessing a first table T1_1 of the stage S(1) to retrieve a first entry E1_1 using a high-order destination divisional bit string DST(1) corresponding to the stage S(1) as a retrieval key, wherein the first entry E1_1 has an offset address matching the high-order destination divisional bit string DST(1): d) accessing a second entry E2_1 of the second table T2 according to a second-table pointer included in the first entry E1_1: e) when a retrieval control flag included in a second entry E2_m indicates continuation of retrieval, accessing a first table T1_1 indicated by a first-table pointer included in the second entry E2_m to retrieve a first entry E1_k from the first table T1_i using a destination divisional bit string of a stage corresponding to the first table T1_i as a retrieval key, wherein the first entry E1_k has an offset address matching the destination divisional bit string of a stage corresponding to the first table T1_i; f) when a retrieved first entry E1_k includes a first-table pointer, directly accessing a first table T1_i indicated by a first-table pointer included in the retrieved first entry E1_k without accessing the second table to retrieve a first entry E1_k from the directly accessed first table T1_k using a destination divisional bit string of a stage corresponding to the directly accessed first table T1_i as a retrieval key; g) accessing another second entry E2_m of the second table T2 according to a second-table pointer included in the retrieved first entry E1_k; h) repeating the steps (e) and (g) when a retrieval control flag included in a second entry E2_m indicates continuation of retrieval, and i) when a retrieval control flag included in a second entry E2_m indicates termination of retrieval, reading a hop pointer included in the second entry E2_m as a retrieval result to terminate the retrieval.

Therefore, when a retrieved first entry includes a first-table pointer, a first table indicated by a first-table pointer included in the retrieved first entry can be directly accessed without accessing the second table, resulting in rapid retrieving operation and further reduced memory capacity of the second table.

Each of the first tables is preferably one of a bit-0 first table and a bit-1 first table. When a head bit of a divisional bit string corresponding to the first table is 0, the bit-0 first table corresponds to a remaining divisional bit string obtained by removing the head bit of 0 from the divisional bit string corresponding to the first table. When a head bit of a divisional bit string corresponding to the first table is 1, the bit-1 first table corresponds to a remaining divisional bit string obtained by removing the head bit of 1 from the divisional bit string corresponding to the first table. In this case, each of the second entries of the second table further includes a bit-0 first table pointer and a bit-1 first table pointer. In the step (e), when a head bit of a corresponding divisional bit string is 0, a bit-0 first table indicated by a bit-0 first table pointer is accessed and, when a head bit of a corresponding divisional bit string is 1, a bit-1 first table indicated by a bit-1 first table pointer is accessed.

By preparing a bit-1 first table and a bit-0 first table for each first table of each stage, either of them can be omitted, resulting in further reduced memory capacity of the first tables. Further, one of the bit-1 and bit-0 first tables is selected and searched depending on the head bit of the destination divisional bit string, resulting in half the number of searched entries.

BRIEF DESCRIPTION OF THE DRAWINGS

FIG. 8 is a data configuration diagram showing entry examples of a first table:

DESCRIPTION OF THE PREFERRED EMBODIMENTS

Figure 1:
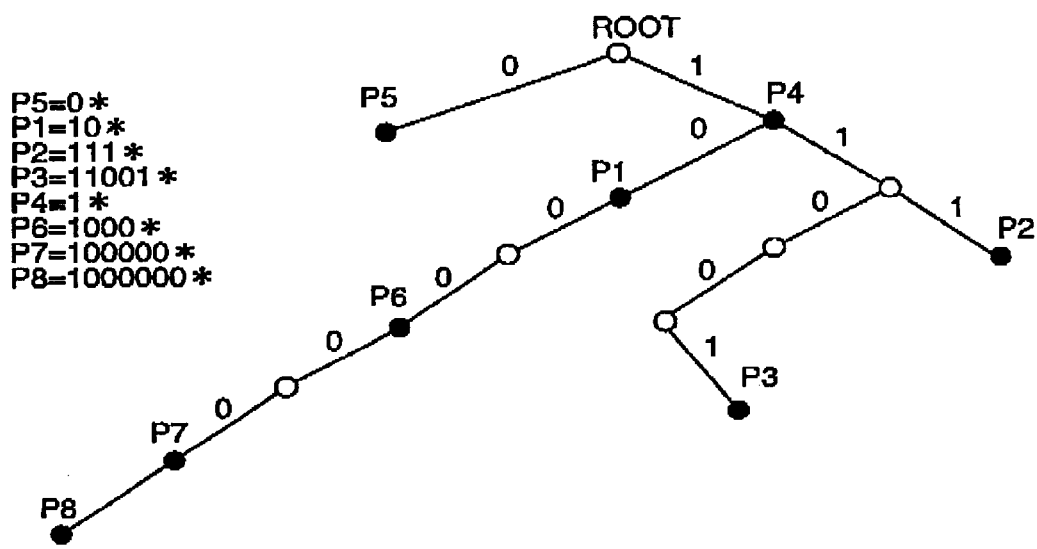
FIG. 1 is a conceptual diagram showing a conventional binary-tree retrieval method.

Hereafter, preferred embodiments of the present invention will be described by referring to the drawings.

In the embodiments hereafter described, the destination address retrieval is executed by a program-controlled processor or a computer. The destination address retrieval program to run on the processor may be provided by a recording medium. Further, in the embodiments hereafter described, retrieval tables are provided as computer readable recording media. As these recording media, for example, magnetic disks, semiconductor memories, or other arbitrary computer readable recording media can be used.

FIRST EMBODIMENT

Device Configuration

First, the configuration of a forwarding destination retrieval device according to a first embodiment of the present invention will now be described by referring to FIG. 6.

A router is provided with the forwarding destination retrieval device according to the first embodiment, which is an device for determining a next forwarding destination or an outgoing link, of a data signal received from another router. For that purpose, the forwarding destination retrieval device uses the ultimate destination address of the received data signal as a retrieval key to retrieve a hop pointer indicative of the forwarding destination of the data signal from the retrieval tables.

Figure 6:
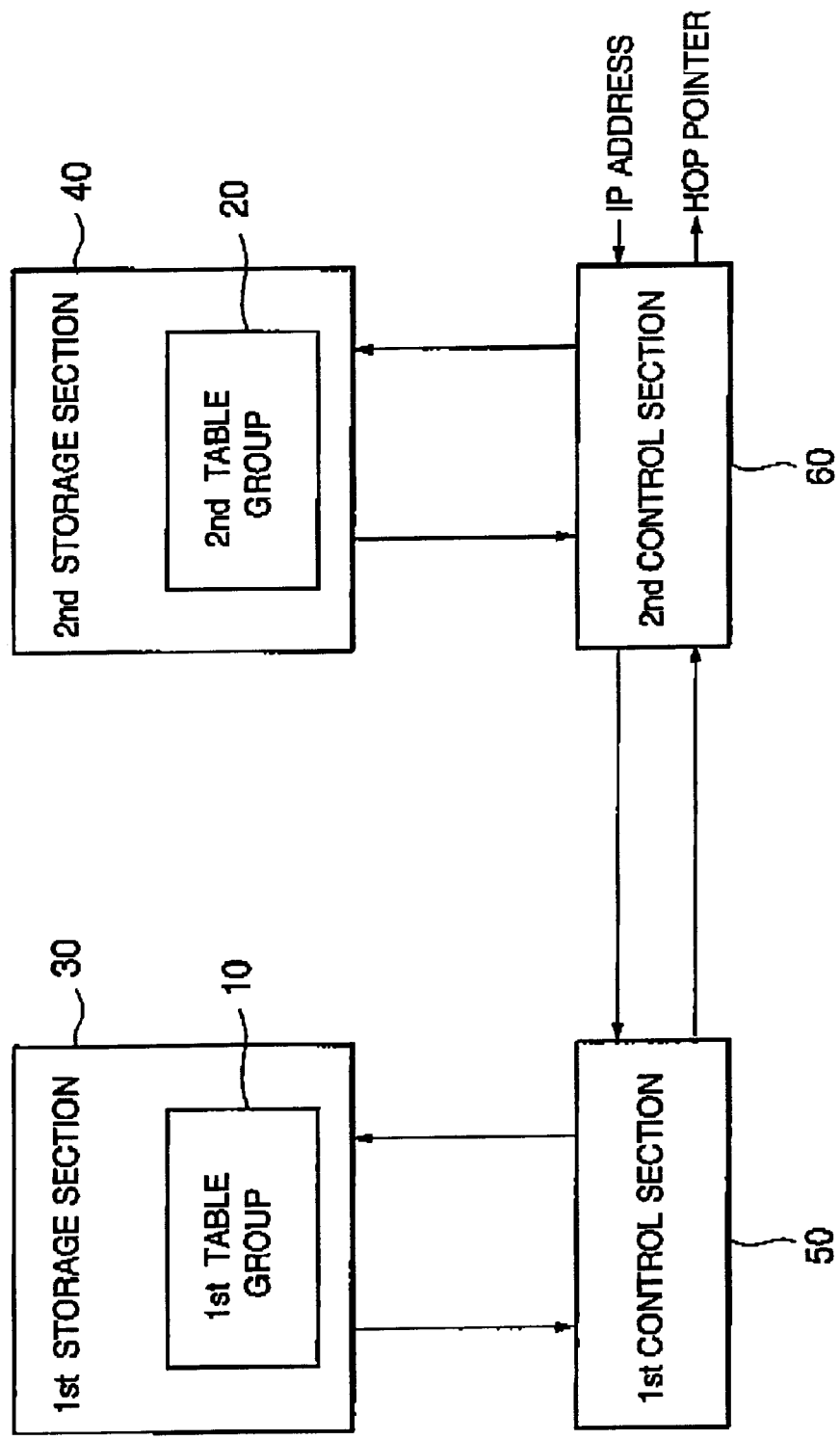
FIG. 6 is a functional block diagram showing the configuration of a forwarding destination retrieval device according to a first embodiment of the present invention.

Referring to FIG. 6, the forwarding destination retrieval device includes a first storage section 30 for storing a first table group 10 forming first retrieval tables, a second storage section 40 for storing a second table group 20 forming second retrieval tables, a first control section 50 for controlling access to the first table group 10, and a second control section 60 for controlling access to the second table group 20.

Each of the first and second storage sections 30 and 40 may be formed of a storage disk, a semiconductor memory, or another arbitrary suitable recording device, allowing a corresponding control section to read and write arbitrary data. The first and second storage sections 30 and 40 may be provided as different memory areas in a single storage device.

Retrieval Table

The first table group 10 and the second table group 20 forming retrieval tables will now be described by referring to FIG. 7.

Figure 7:
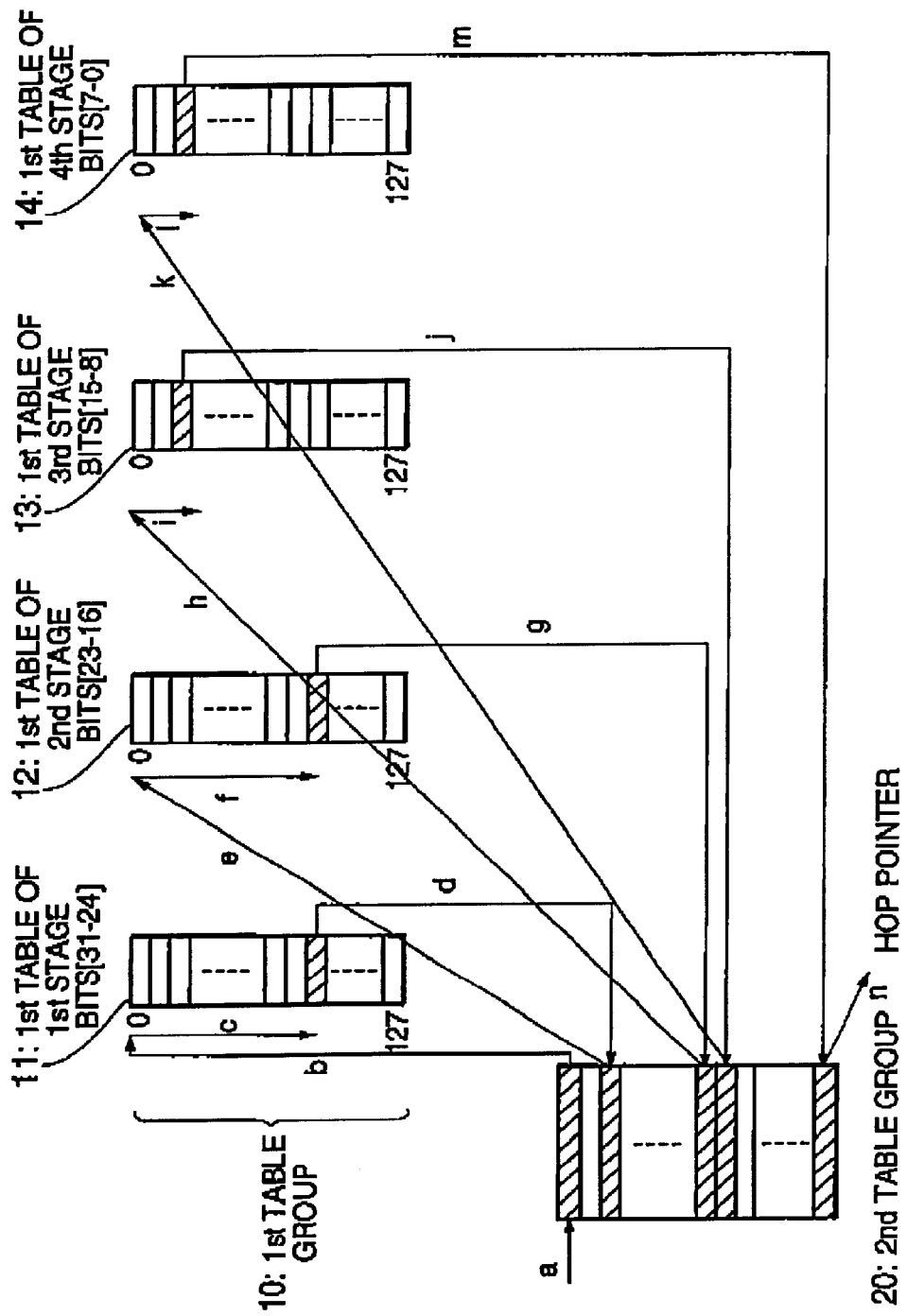
FIG. 7 is a conceptual configuration diagram of retrieval tables showing a forwarding destination retrieval method according to the first embodiment.

As shown in FIG. 7, the first table group 10 is composed of four first tables 11 to 14, which correspond respectively to divisional bit strings which are obtained by dividing a 32-bit string assigned to the ultimate destination address of the received data signal into four stages (first stage to fourth stage) each having eight bits beginning from the higher-order bit. Hereinafter, the four first tables 11–14 are individually identified by using the first to fourth stages.

More specifically, the first table 11 of the first stage corresponds to a divisional bit string of high-order $31^{st}$ to $24^{th}$ bits (hereafter represented as "bits [31–24]) included in a 32-bit string formed of the $31^{st}$ to $0^{th}$ bits. In succession, the first table 12 of the second stage corresponds to a divisional bit string of bits [23–16]. In the same way, the first table 13 of the third stage corresponds to a divisional bit string of bits [15–8]. The first table 14 of the fourth stage corresponds to a divisional bit string of bits [7–0].

Further, in the first embodiment, the first table of each stage is composed of a table for bit "0" (hereafter called "bit-0 first table$^T$) and a table for bit "1" (hereafter called "bit-1 first table"). For simplicity, however, only one of the bit-0 and bit-1 first tables is shown as a first table of each stage in FIG. 7.

More specifically, in the case where the value of the head bit of the divisional bit string corresponding to each of the first tables 11 to 14 of respective stages is "0," a bit-0 first table corresponds to a remaining divisional bit string obtained by removing the head bit of 0 from the divisional bit string. For example, the bit-0 first table of the first stage corresponds to bits [30–24] included in the divisional bit string of bits [31–24] with the head bit value of the $31^{st}$ bit being "0". It is the same with the other bit-0 first tables of the second and later stages.

In the case where the value of the head bit of the corresponding divisional bit string of each of the first tables 11 to 14 of respective stages is "1", the bit-1 first table corresponds to a remaining divisional bit string obtained by removing the head bit of 1 from the divisional bit string. For example, the bit-1 first table of the second stage corresponds to bits [22–16] included in a divisional bit string of bits [23–16] with the head bit value of the $23^{rd}$ a bit being "1". It is the same with the other bit-1 first tables.

By thus dividing the first table of each stage into the bit-0 first table and the bit-1 first table, either the bit-0 first table or the bit-1 first table can be omitted, in the case where a pertinent registered entry is not present. As a result, the memory capacity for storing the first tables can be reduced.

In this manner, the respective first tables 11 to 14 have the values of divisional bit strings of corresponding stages as offset addresses of entries thereof. Further, each of the first tables 21 to 14 for bit "0" or bit "1" of each stage has a divisional bit string values represented by a remaining bit string obtained by removing the head bit of a divisional bit string, as an offset address of each entry. Therefore, the number of entries of the bit-0 first table or the bit-1 first table for each stage becomes half the number of entries of the original first table.

To be concrete, the first table 11 for bit "0" or bit "1" of the first stage has $0^{th}$ to $127^{th}$ entries respectively having divisional bit string values (000 0000) to (111 1111) represented by 7-bit divisional bit strings of bits [30–24] as offset addresses. The first table 12 for bit "0" or bit "1" of the second stage has $0^{th}$ to $127^{th}$ entries respectively having divisional bit string values (000 0000) to (111 1111) represented by 7-bit divisional bit strings of bits [22–16] as offset addresses. In the same way, each of the first table 13 and 14 for bit "0" or bit "1" of the third stage and fourth stage has $0^{th}$ to $127^{th}$ entries respectively having divisional bit string values (000 0000) to (111 1111) as offset addresses.

It should be noted that, in FIG. 7, representative one is shown as each of the first tables 11 to 14 of respective stages. As a matter of fact, the first tables 12 to 14 of the second and later stages are provided individually for each of registered entries of the preceding stage. In other words, in the present embodiment, the maximum number of the bit-0 or bit-1 first tables 12 of the second stage becomes equal to the number of all entries ($2^7$=128) of the bit-0 or bit-1 first table 11 of the first stage.

Further, the first table 13 of the third stage is provided individually for each of the registered entries of the bit-0 or bit-1 first table 12 of the second stage. Therefore, the maximum number of the bit-0 or bit-1 first tables 13 of the third stage becomes equal to $128^2$. In the same way, the maximum number of the first tables 14 of the fourth stage becomes equal to $128^3$.

In the first tables 11 to 14, however, destination addresses are not always registered in all entries.

In the case where an offset address of a first table matches a divisional bit string value corresponding to the pertinent stage in the bit string value of the registered address, the first table has a second table pointer indicating an entry of the second table to be subsequently accessed, as the entry content of the offset address.

First Table

Entry contents of a first table will now be described by referring to FIG. 8.

For simplicity, the description will be made, taking as an example the first table 11 for bit "0" of the first stage in the case where the value of the $31^{th}$ bit of bits [31–24] is "0", in other words, the first table 11 corresponds to bits [30–24] obtained by removing the $31^{st}$ bit from the divisional bit string of 8 bits located at the highest-order stage. Therefore, the number of entries of the first table 11 for bit "0" becomes 128 (=$2^{(0-1)}$). And addresses of $0^{th}$ to $127^{th}$ entries correspond to offset addresses of (000 0000) to (111 1111), respectively.

If the least significant bit of the significant bit string of a registered address is located only in the middle of the divisional bit string, then the first table has a common second table pointer as the content of an entry of each of the offset addresses including in common an significant bit string portion corresponding to the divisional bit string included in the significant bit string, in the same way as the conventional expansion method.

In FIG. 8, the case where the bit string of a registered address is expanded and registered will now be described, assuming that bit strings of two registered addresses are expanded in conformity to divisional bit strings and are registered.

In the case where bits [31–24] of a divisional bit string corresponding to the first stage in a first registered address "R1" are (00 **), the least significant bit of the significant bit string of the registered address "R1" is a $30^{th}$ bit which is in the middle of the divisional bit string. Bit values of $29^{th}$ bit and lower-order bits corresponding to 6 bits are undetermined as marked *. If this registered address is expanded, therefore, then 64 (=$2^6$) divisional bit string values ranging from (0000 0000) to (0011 1111) includes an significant bit string portion (00) in common.

Then, as shown in FIG. 8, a second table pointer for R1 is set in $0^{th}$ to $63^{rd}$ entries having offset addresses (000 0000) to (011 1111) among all entries of the bit-0 first table of the first stage.

In the case where bits [31–24] of the divisional bit string corresponding to a first stage of a second registered address "R2" are (01 **), the least significant bit of the significant bit string of the registered address "R2" is a $30^{th}$ bit which is in the middle of the divisional bit string. Bit values of $29^{th}$ bit and lower-order bits corresponding to 6 bits are undetermined as marked *. If this registered address is expanded, therefore, then 64 (=$2^6$) divisional bit string values ranging from (0100 0000) to (0111 1111) includes an significant bit string portion (01) in common.

As shown in FIG. 8, therefore, the second table pointer for R1 is set in $64^{th}$ to $127^{th}$ entries having offset addresses (100 0000) to (111 1111) among all entries of the bit-0 first table of the first stage. Entries other than the registered entries are "NUL".

Second Table

Figure 9:
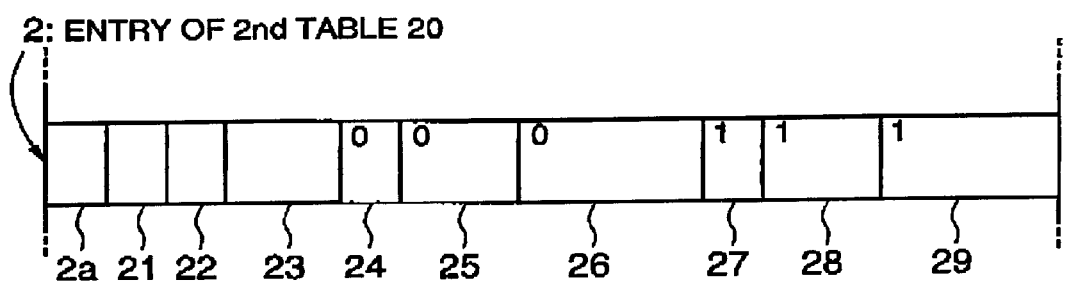
FIG. 9 is a data configuration diagram showing entry configuration of a second table according to the first embodiment.

In FIG. 9, the contents of an entry 2 of the second table 20 are typically shown. Each entry of the second table has a head pointer field 2a followed by nine fields: a continuation/end flag field 21, an update flag field 22, a hop pointer field 23, a bit-0 table type flag field 24 a bit-0 first table pointer field 25, a registered address and prefix length field 26 for a single bit-0 first table, a bit-1 table type flag field 27, a bit-1 first table pointer field 28, and a registered address and prefix length field 29 for a single bit-1 first table.

In the continuation/end flag field 21, a continuation/end flag indicating the continuation or end of the retrieval is written. In the update flag field 22, an update flag indicating whether a hop pointer should be updated is written. In the hop pointer field 23, a pointer indicating the location at which the next forwarding destination address of a received data signal is stored is written.

Further, in the second table 20, the fields of each entry are divided depending on the head bit value, "0" or "1", of the divisional bit string. In other words, in each of the bit-0 table type flag field 24 and the bit-1 table type flag field 27, there is set a table type flag indicating whether the type of the first table indicated by the first table pointer of the entry is a one-entry first table. The details of the one-entry first table will be described in a second embodiment of the present invention.

In the bit-0 first table pointer field 25 and the bit-1 first table pointer field 28, there are set first table pointers each indicating the bit-0 first table and the bit-1 first table to be subsequently accessed in accordance with the bit string value of the registered address.

In the registered address and prefix length fields 26 and 29 for the bit-0 one-entry first table and the bit-1 one-entry first table, there are set the divisional bit string value and prefix length of the registered address registered in the single entry of a one-entry first table in the case where the first table indicated by the first table pointer is the one-entry first table.

In the first embodiment, as described before, the head pointer field 2a for storing a head pointer indicating the head position address of the first table 11 of the highest stage is provided in the head entry of the second table 20.

Operations

Operations of the forwarding destination retrieval device according to the first embodiment will now be described.

It is assumed that an IP packet signal conforming to IPv4, i.e., a data signal having a 32-bit destination address (IP address) has been received by a router. This destination address is first inputted to the second control section 60 in the router (see FIG. 6).

Hop Pointer Retrieval

Referring to FIG. 7, in retrieval of a hop pointer indicating the forwarding destination of the destination address, the second control section 60 accesses the head entry of the second table 20 stored in the second storage section 40 (as indicated by an arrow "a" of FIG. 7).

In the case where the bit value of the head bit (Bit (31)) of the destination address is "0," the second control section 60 reads out the bit-0 first table pointer indicated by the head entry from the second table 20. The bit-0 first table pointer of the head entry indicates the head entry location (base address) of the bit-0 first table pointer of the first stage in the first storage section 30, the case where the bit value of the head bit of the destination address is "1," the second control section 60 reads out the bit-1 first table pointer. The bit-1 first table pointer of the head entry indicates the head entry location (base address) of the bit-1 first table pointer of the first stage in the first storage section 30.

Hereafter, in order to simplify explanation, both the bit-0 first table and the bit-1 first table are referred to simply as first table, except the case where it is necessary to discriminate the bit-0 first table and the bit-1 first table.

The second control section 60 reads out "NUL" as the initial value of the hop pointer Thereafter, the second control section 60 forwards the first table pointer read out and the hop pointer serving as an internal variable together with the destination address to the first control section 50. In order to omit the memory access to the second table 20, the head entry of the second table 20 may be provided in the second control section 60 beforehand.

Then, the first control section 50 accesses the head entry of the first table 11 of the first stage indicated by the first table pointer received from the second control section 60 (as indicated by an arrow "b" of FIG. 7)

Figure 2:
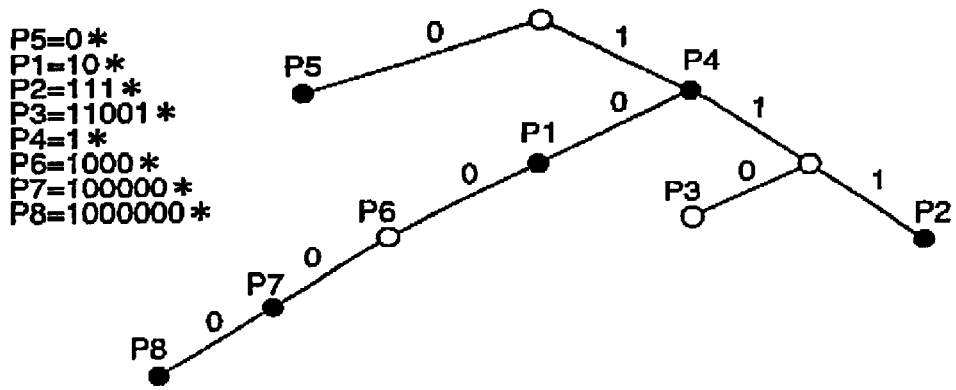
FIG. 2 is a conceptual diagram showing a conventional radix-tree retrieval method.
Figure 3:
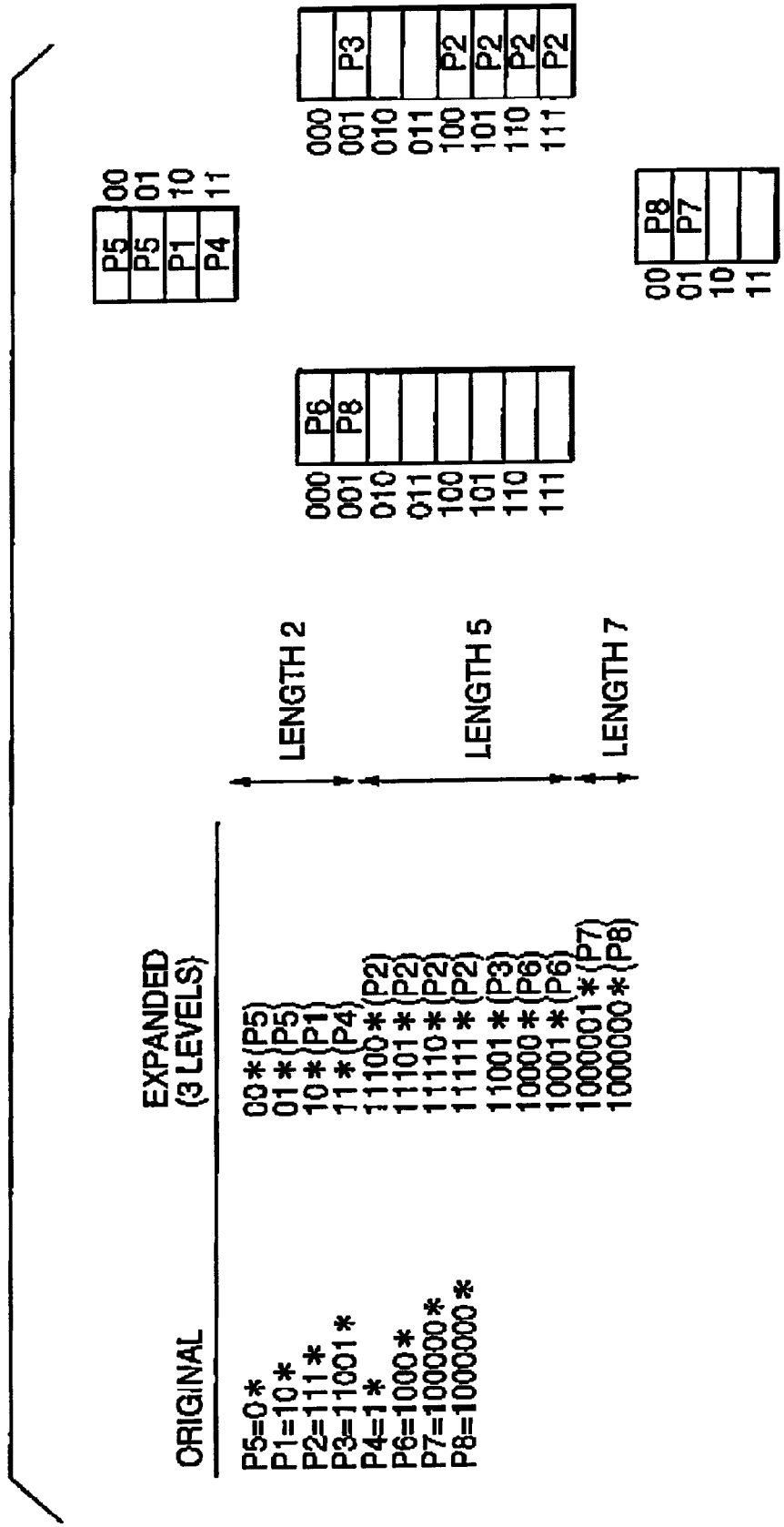
FIG. 3 is a conceptual diagram showing a conventional expansion method.
Figure 4:
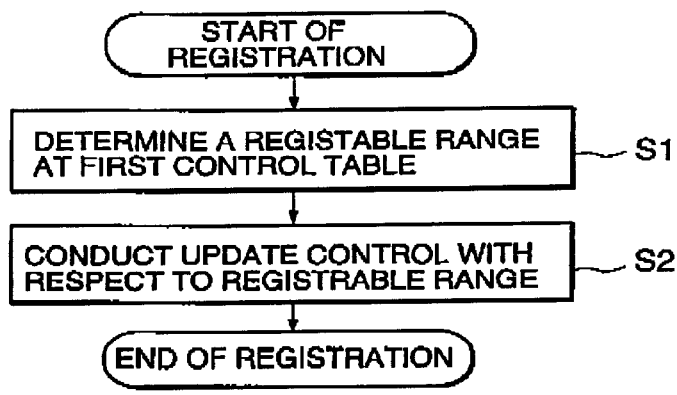
FIG. 4 is a flow chart showing an example of a registration procedure in the conventional expansion method.
Figure 5:
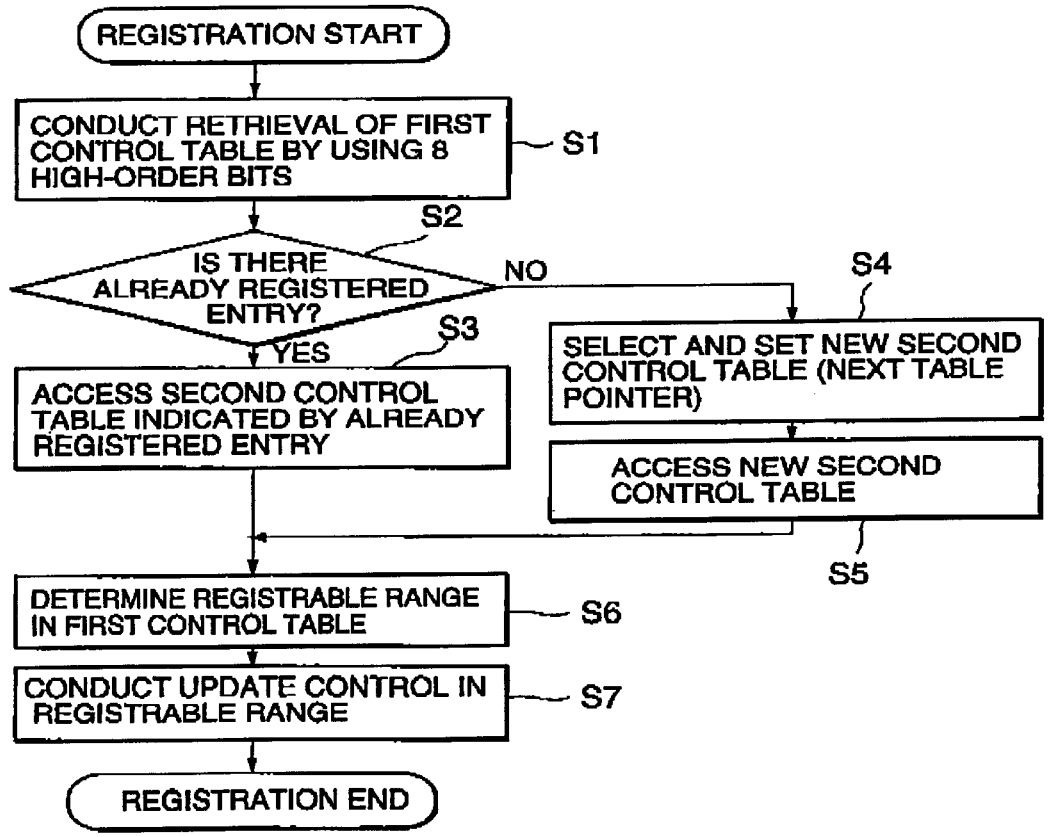
FIG. 5 is a flow chart showing another example of a registration procedure in the conventional expansion method.

The first control section 50 sequentially divides the 32-bit destination address from the most significant bit into four stages each having eight bits. Subsequently, the first control section 50 uses as a retrieval key the divisional bit string value of the highest stage among divisional bit string values obtained as a result of the division. By using this retrieval key, the first control section 50 retrieves the offset address from the first table 11 of the first stage (as indicated by an arrow "c" in FIG. 2).

As a result of the first retrieval, the first control section 50 reads out a second table pointer from an entry having the offset address which matches the divisional bit string value of the retrieval key. Then, the first control section 50 sends the second table pointer to the second control section 60.

A control flow of the second control section 60 which has received the second table pointer from the first control section 50 will be described hereafter by referring to FIG. 10.

Figure 10:
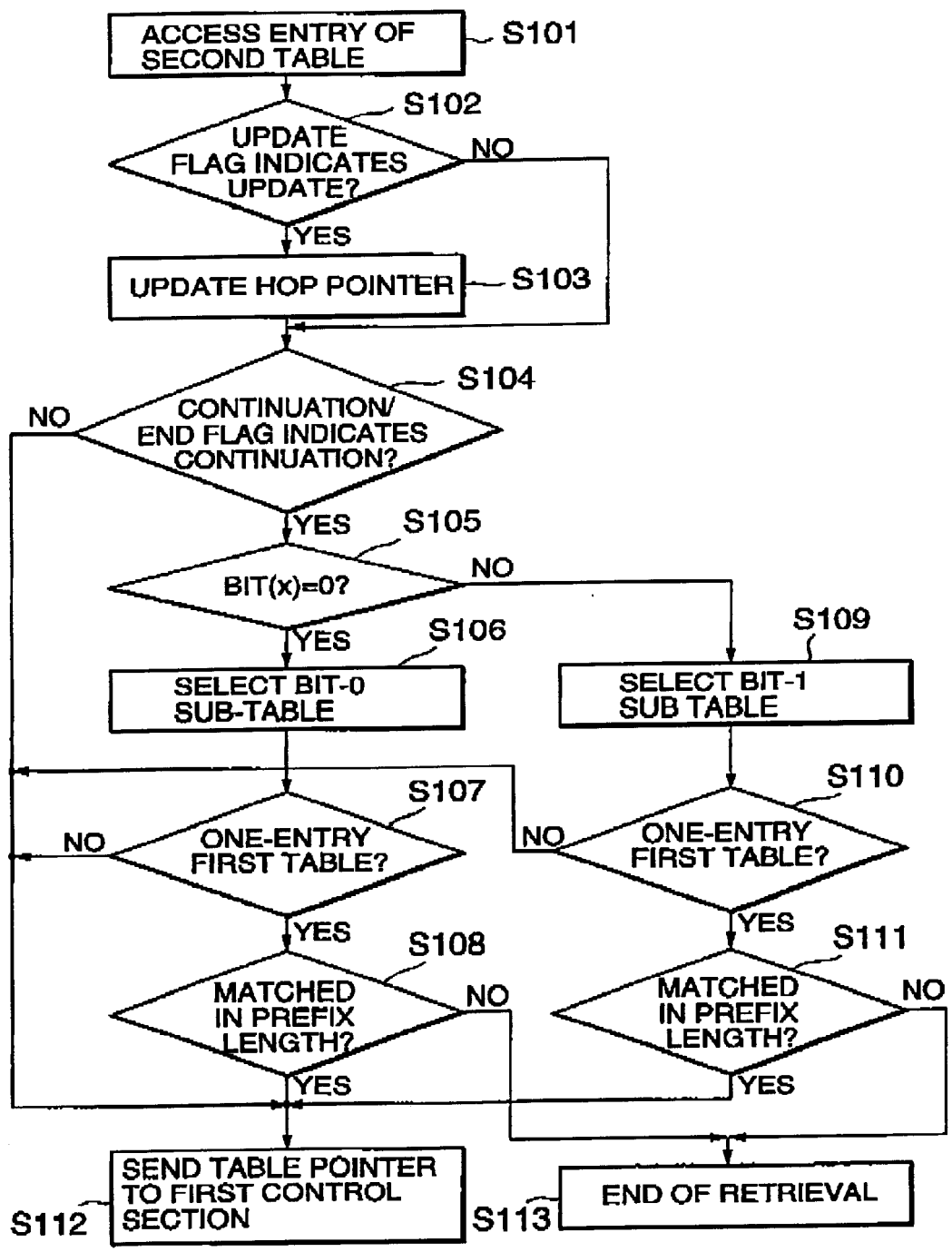
FIG. 10 is a flow chart showing an operation example conducted when accessing the second table.

As shown in FIG. 10, the second control section 60 first accesses an entry of the second table 20 indicated by the second table pointer (step S101), which is indicated by an arrow "d" of FIG. 7.

The second control section 60 then determines whether an update flag of the entry of the second table 20 indicates updating (step S102). If the update flag indicates updating (YES in step S102), then the second control section 60 updates the hop pointer held as the internal variable by replacing it with a new hop pointer included in the entry (step S103).

On the other hand, when the update flag does not indicate updating or after the hop pointer has been updated, the second control section 60 determines whether the continuation/end flag of the entry indicates continuation (step S104). If the continuation/end flag indicates the end of retrieval (NO at step S104), the second control section 60 outputs the hop pointer held as the internal variable at that stage as a hop pointer indicating the next forwarding destination.

If the continuation/end flag of the entry indicates the continuation of the retrieval (YES at step S104), then the second control Beotion 60 determines whether the head bit value of the divisional bit string is "0" or "1" (step S105). Here, the second control section 60 determines whether the value of Bit(24), 24$^{th}$ bit, which is the head bit of the divisional bit string of the second stage is "0" or "1". Similarly, in the case of the third stage, the second control section 60 determines whether the value of Bit(15) is "0" or "1". In the case of the fourth stage, the second control section 60 determines whether the value of Bit(7) is "0" or "1".

If the value of Bit(24) is "0" (YES at step S105) the second control section 60 reads out the bit-0 first table pointer from the entry (step S106). If the value of Bit(24) is "1" (NO at step S105), the second control section 60 reads out the bit-1 first table pointer from the entry (step S109).

On the basis of the table type flag of the entry, the second control section 60 determines whether the first table indicated by the first table pointer is a one-entry first table (step S107 or S110). If the first table is not a one-entry first table (NO at step S107 or S110), the second control section 60 sends the first table pointer to the first control section 50 (step S112).

If the table kind flag indicates a one-entry first table (YES at step S107 or S110), the second control section 60 reads out a prefix length from the field 26 or 29 of the entry, which will be described later. And the second control section 60 determines whether a portion having the prefix length from the high order of the divisional bit string value of the stage matches the divisional bit string value of a registered address corresponding to the one-entry first table (step S108 or S111).

If a match is found (YES in step S108 or S111), the second control section 60 sends the first table pointer to the first control section 50 (step S112). If no match is found (NO in step S108 or S111), the second control section 60 determines retrieval failure and terminates the retrieval (step S113).

If the first table pointer is received again from the second control section 60, then the first control section 50 accesses the head entry of the first table of the second stage indicated by the first table pointer (as indicated by an arrow "e" in FIG. 7).

In the same way as the first stage, the first control section 50 searches the first table 12 of the second stage by using as a key a divisional bit string value corresponding to the second stage of the destination address (as indicated by an arrow "f" in FIG. 7).

The first control section 50 repeatedly reads out a second table pointer from the entry of an offset address matching the divisional bit string value and sends it to the second control section 60.

If the retrieval is not finished, then the second control section 60 accesses the second table 20 (as indicated by an arrow "g" in FIG. 7). Thereafter, the first control section 50 accesses the first table 13 of the third stage indicated by a first table pointer of an entry of the second table 20 (as indicated by an arrow who in FIG. 7).

The first control section 50 retrieves an offset address matching a divisional bit string value corresponding to the third stage of the destination address (as indicated by an arrow "i" in FIG. 7). In succession, the second control section 60 accesses an entry of the second table indicated by a second table pointer of an entry of the offset address (as indicated by an arrow "j" in FIG. 7).

If the retrieval is not finished after the retrieval of the first table 13 of the third stage, then the first control section 50 accesses the first table 14 of the fourth stage indicated by a first table pointer in an entry of the second table 20 (as indicated by an arrow "k" in FIG. 7). The first control section 50 retrieves an offset address which matches a divisional bit string value corresponding to the fourth stage of the destination address (as indicated by an arrow "1" in FIG. 7). In succession, the second control section 60 accesses an entry of the second table indicated by a second table pointer of an entry of the offset address (as indicated by an arrow "m" in FIG. 7). Finally, in the case where the continuation/end flag of an entry of the second table indicated by a second table pointer indicates the end of the retrieval, the second control section 60 reads out a hop pointer of the entry, and outputs the hop pointer as the next forwarding destination (as indicated by an arrow "n" in FIG. 7). As described above, the hop pointer indicating the next forwarding destination can be retrieved.

Hop Pointer Updating

An updating of the hop pointer conducted depending on an update flag of the update flag field 21 will now be described in detail. It will be described using the same configuration example formed of IP addresses of registered P1 to P8 as the tree structure of FIG. 1, which was used in the description of the conventional binary tree retrieval method.

Figure 11:
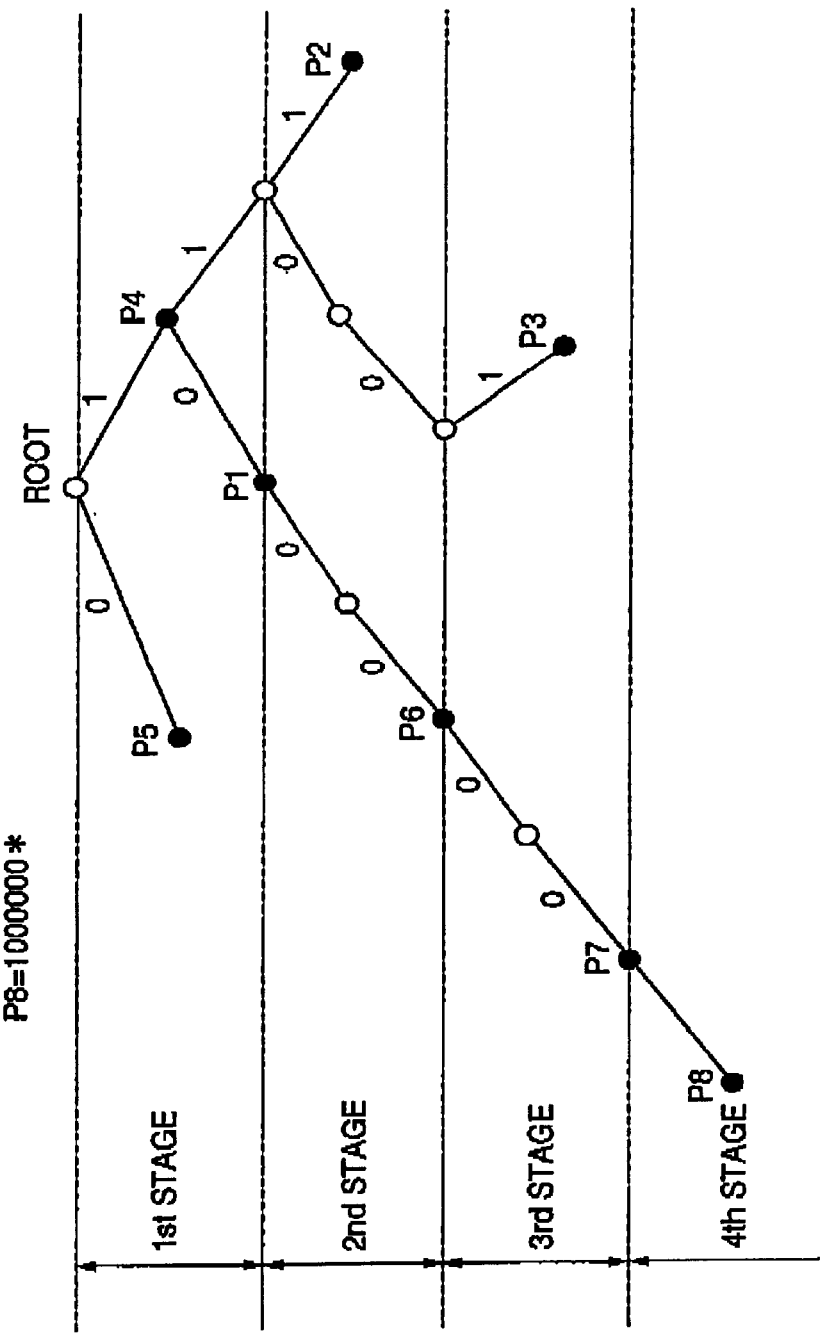
FIG. 11 is a conceptual diagram showing whether a hop pointer should be updated.

Referring to FIG. 11, assuming that an IP address is divided into 2-bit portions, the first table of the first stage corresponds to first and second bits, the first table of the second stage corresponds to third and fourth bits, the first table of the third stage corresponds to third and fourth bits, and the first table of the fourth stage corresponds to seventh and eighth bits.

Changes of hop pointers in the case where the IP address of P8 is retrieved will now be described. First, an initial hop pointer is set in a head entry of the second table.

Further, in an entry of the second table indicated by a second table pointer retrieved in the first table of the first stage, a hop pointer indicating the IP address of P6 is set as a new hop pointer together with an update flag indicating updating.

In an entry of the second table indicated by a second table pointer retrieved in the first table of the second stage, a hop pointer indicating the IP address of P7 is set as a new hop pointer together with an update flag indicating updating.

In an entry of the second table indicated by a second table pointer retrieved in the first table of the third stage, a hop pointer indicating the IP address of P8 is set as a new hop pointer together with an update flag indicating updating.

By setting hop pointers in the entries of the second table as described above, the hop pointer is successively updated from the initial setting to hop pointers indicating P1, P6 and P7, and finally the hop pointer of PS is retrieved.

For example, if the IP address of P6 shown in FIG. 11 has not been registered, then it is not necessary to update the hop pointer at that stage. Therefore, in an entry of the second table indicated by the second table pointer retrieved in the first table of the second stage, an update flag which does not indicate updating is set. And the hop pointer is made "NUL". In this case, the hop pointer skips P6 and is successively updated from the initial setting to P1, P7, and then P8.

Change of Retrieval Table

According to the present invention, as a general rule, only a second table pointer is set in an entry of the first table. In changing of registered addresses of the retrieval tables, therefore, it is only necessary to change first table pointer and hop pointer depending on an entry of the second table second table pointer. In changing of an entry of the first table, it is only necessary to change second table pointer. Therefore, changing of actual information concerning the forwarding destination such as the hop pointer can be conducted by using only the second table. As a result, a change of a registered address can be conducted easily.

As an example of changing operation (including addition, updating, and deletion) of a retrieval table, an IP address registration method according to the present invention will be described by referring to FIGS. 12 and 13 in the case where a 32-bit IP address is divided into four divisional bit strings each having eight bits.

Figure 12:
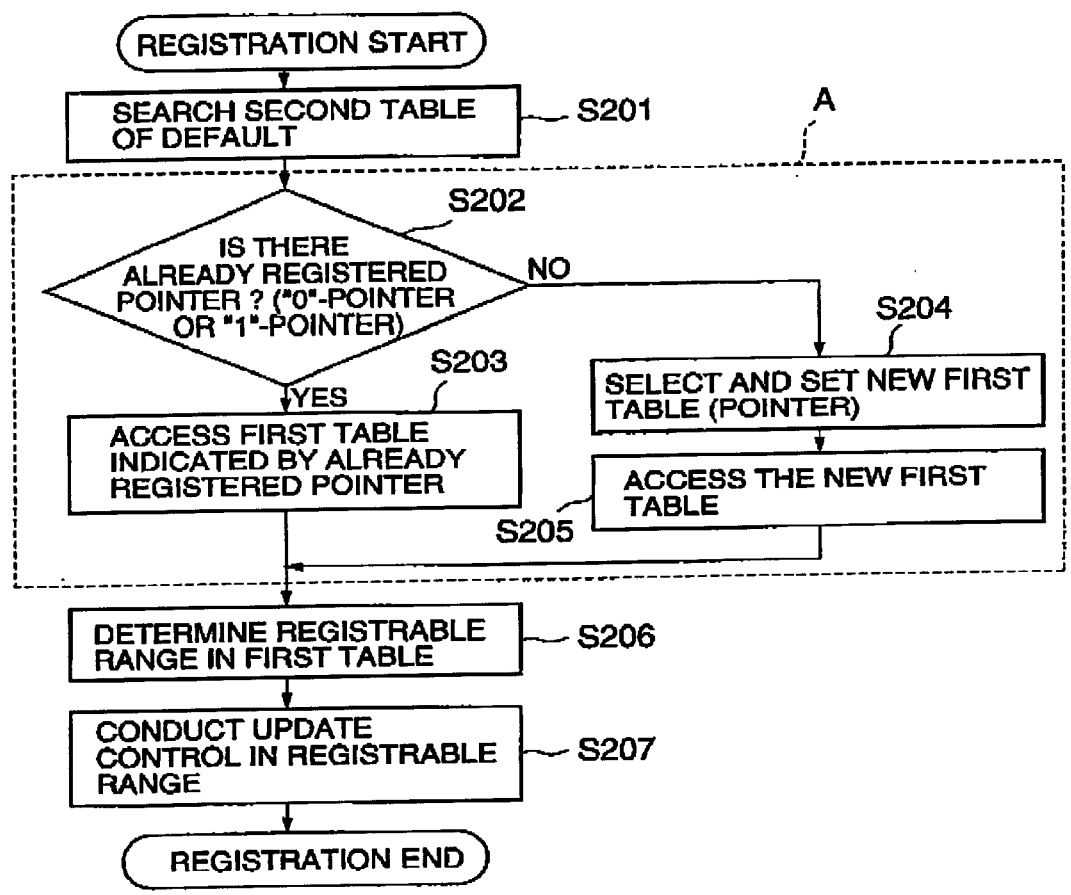
FIG. 12 is a flow chart showing a method of changing a registered destination address.

FIG. 12 shows a procedure for registering an IP address having a prefix length of 8 bits or less. In this case, registering is conducted for only the second table and the first table of the first stage.

Referring to FIG. 12, when starting the registration, retrieval is first conducted in a second table by default (step S201). Here, the head entry of the second table is accessed.

In the second table, it is determined whether a first table pointer indicating the first table corresponding to the IP address has been registered (step S202). Here, it is determined whether in the head entry a bit-0 or bit-1 first table pointer corresponding to the head bit value of the IP address to be registered has already been set. As an example, the case where the IP address to be registered to "8. 0. 0. 0" having a prefix length of "1" will be described. Since in this case the head bit value is "1," the bit-1 first table pointer field is checked.

If the first table pointer corresponding to the head entry has been already set (YES at step S202), the first table of the first stage indicated by the pointer is accessed (step S203). For example, if a first table pointer is set in the bit-1 first table pointer field, the bit-1 first table indicated by the pointer is accessed.

On the other hand, if the first table pointer corresponding to the head entry is not yet set (NUL), a first table pointer indicating a new first table is set in the second table (step S204). Here, in the bit-1 table pointer field of the head entry of the second table, a first table pointer indicating a new bit-1 first table which is not yet used is set. The first table of the first stage indicated by the new first table pointer is then accessed (step S205).

Subsequently, a range which can be registered in the first table is determined (step S206). This first table is a first table accessed according to the first table pointer of the head entry of the second table in the step S203 or a new first table accessed according to the first table pointer which is newly set in the head entry of the second table at the step S205.

As an example, in the case where the IP address to be registered is "8. 0. 0. 0" having a prefix length "1", all divisional bit strings of 8 high-order bits having a first bit of "1" among bit strings of the entry address become the registrable range in the same way as the conventional expansion method as described earlier. In other words, entries ranging from "128 (=1000 0000). 0. 0. 0" to "255 (=1111 1111). 0. 0. 0" become the registrable range.

Thereafter, updating control is performed for the registrable range (step S207). More specifically, if a second table pointer corresponding to an IP address already registered is not included in the entries in the registrable range determined at the step S206, a second table pointer corresponding to a new IP address is set in entries in the range. As for the second table pointer newly set, a second table pointer indicating an entry which has not yet been used (NUL) of the second-table is selected. In the selected entry, a hop pointer of the registered IP address is set, and registration is finished.

If an already registered IP address is included in the range, then the prefix length of the already registered IP address is first compared with the prefix length of the IP address to be newly registered. If the already registered prefix length is equal to or longer than the new prefix length, then the already registered content is left intact, and the registration is finished.

On the other hand, if the already registered prefix length is shorter than the new prefix length, then the content of the entry in the range is updated so as to become a second table pointer corresponding to the IP address to be newly registered. As the updated second table pointer, a pointer indicating an entry which has not been used (NUL) of the second table is used. A hop pointer of the registered IP address is cot in the selected entry, and the registration is finished.

Figure 13:
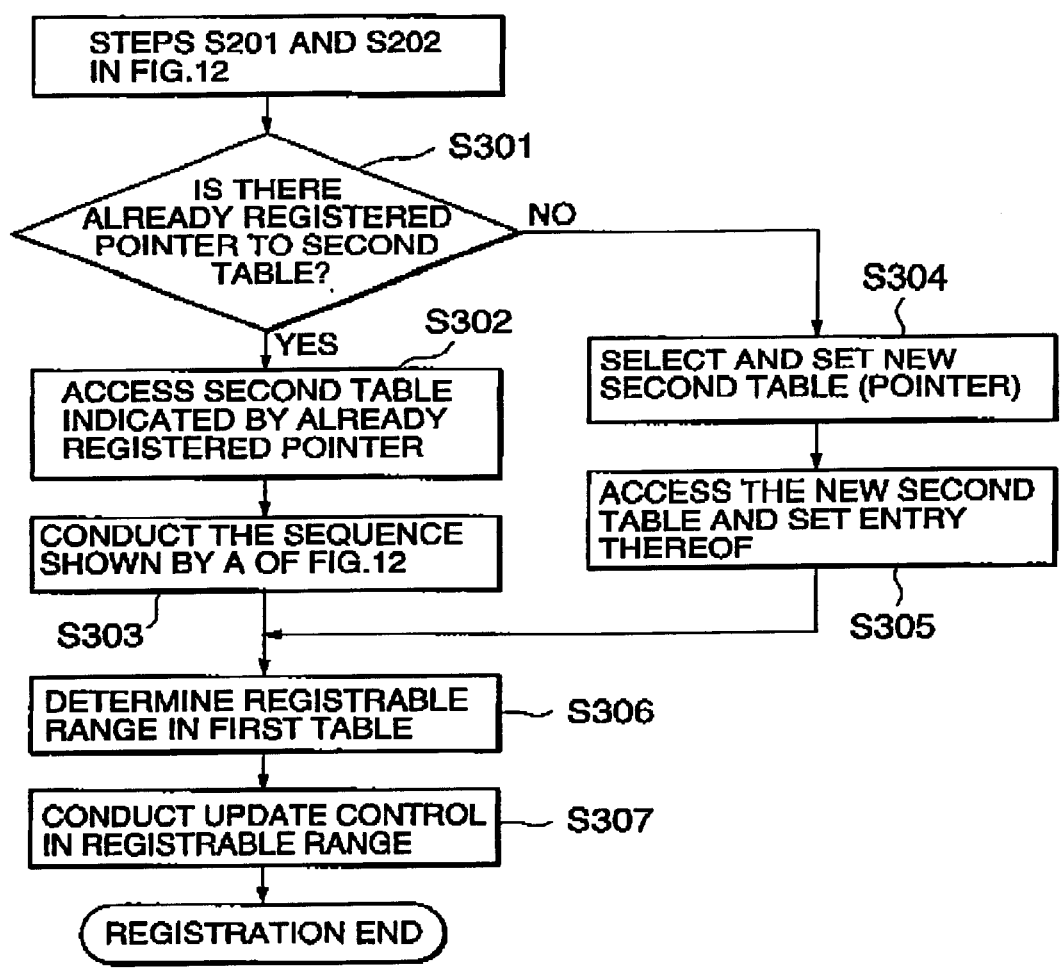
FIG. 13 is a flow chart showing a method of changing a registered destination address.

FIG. 13 shows a procedure for registering an IP address in the case where the prefix length of the IP address to be registered is longer than 8 bits and not longer than 16 bits in 32 bits. In this case, registration is conducted for the second table and the first tables of the first and second stages.

In FIG. 13, after the steps S201–S202 of FIG. 12 have been performed, the following processing is performed.

First, it is determined whether there is a second table pointer which has been already registered (step S301). If there is a second table pointer already registered (YES at step S301), an entry of the second table indicated by the pointer is accessed (step S302) and then the steps S202–S205 enclosed with a broken line A of FIG. 12 are performed (step S303).

On the other hand, if there is not a second table pointer already registered (NO at step S301), a new second table pointer is set (step S304). Subsequently, the content of an entry of the second table indicated by the newly set second table pointer is set (step S305).

In the same way as the step S206 of FIG. 12, a registrable range in the first table is determined (step S306). Subsequently, updating registration is conducted for the registrable range in the same way as the step S207 of FIG. 12 (step S307), and the registration is finished.

Also in the case where the prefix length of the IP address to be registered is longer than 16 bits and not longer than 24 bits, and in the case where the prefix length of the IP address to be registered is longer than 24 bits and not longer than 32 bits, the entry setting can be conducted in the same way.

In the above described embodiment, additional registration has been described as a changing operation of the IP address. Registered address updating and deleting can be similarly conducted in principle by changing only the second table pointer in the first table.

In the pertinent entry of each of the first tables, it is thus only necessary to change a second table pointer. Changing information concerning the forwarding destination such as a hop pointer can be conducted by changing only the second table. In the present invention, therefore, the changing operation of registered addresses can be conducted easily.

SECOND EMBODIMENT

In General, if the number of registered addresses is small with respect to the length of a bit string assigned to the destination address, then the number of entries registered in one first table is also small. In this case, the case where one first table has only one registered entry often occurs. In such a case, ensuring the memory area of the first table having all entries corresponding to the divisional bit string for only one registered entry results in waste of the memory capacity.

In the second embodiment, therefore, a one-entry first table is provided in order to save the memory capacity.

Figure 14:
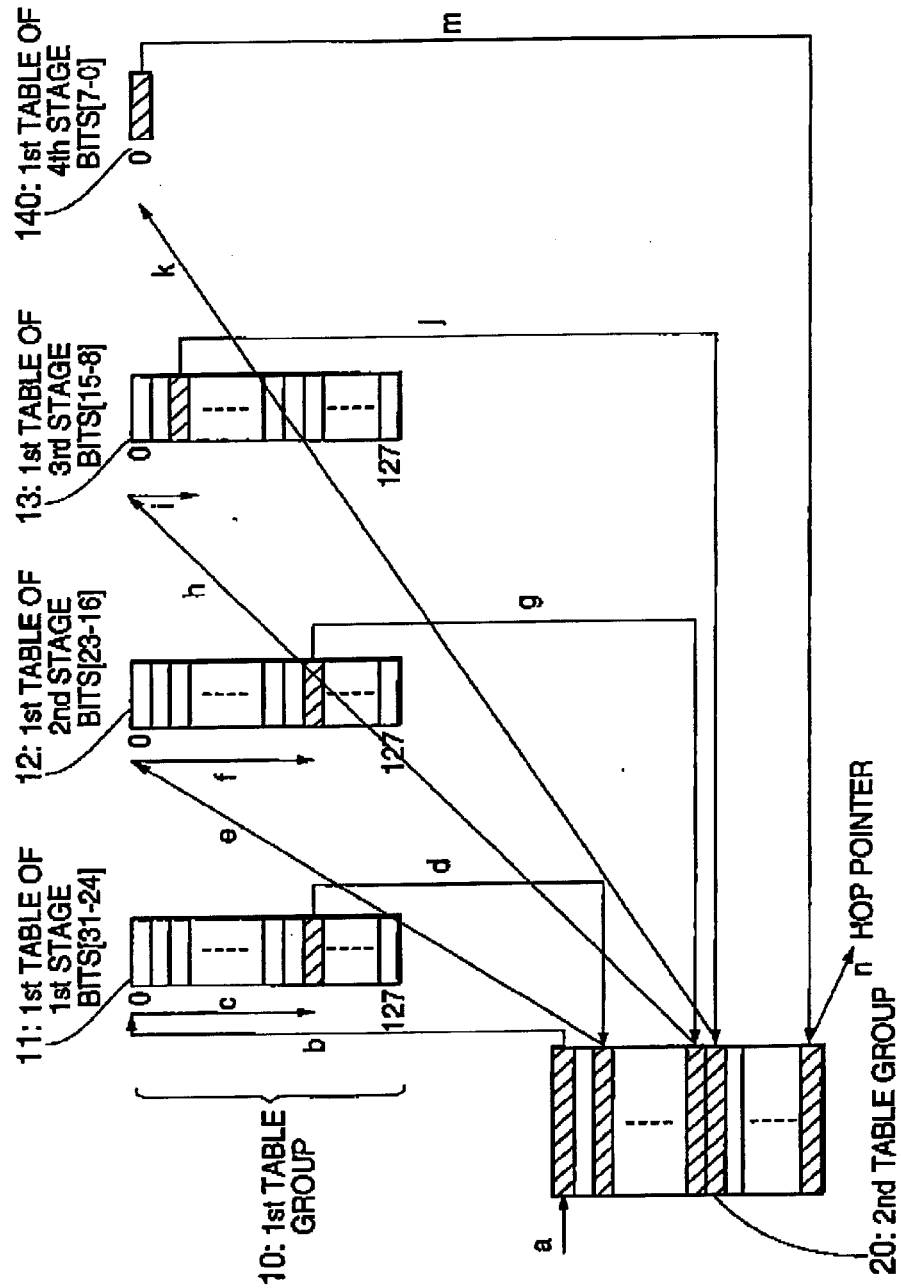
FIG. 14 is a conceptual configuration diagram of retrieval tables showing a forwarding destination retrieval method according to a second embodiment of the present invention.

As shown in FIG. 14, a first table 140 of the fourth stage is a one-entry first table in the second embodiment, where other blocks similar to those previously described with reference to FIG. 7 are denoted by the same reference numerals and the details thereof are omitted.

Hereafter, the one-entry first table will be described in comparison with the ordinary first table.

Figure 15A:
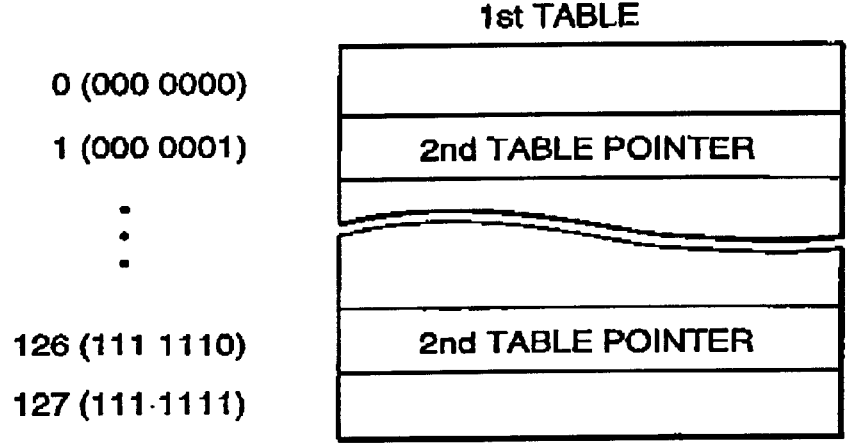
FIG. 15A is a data configuration diagram of an ordinary first table.

As shown in FIG. 15A, an ordinary first table includes a plurality of entries. In an entry having an address matching the divisional bit string value of a registered address, a second table pointer corresponding to the registered address is set. In the example as shown in FIG. 15A, a second table pointer is set in each of a first entry having an entry address (000 0001) and a $126^{th}$ entry having an entry address (111 1110).

Figure 15B:
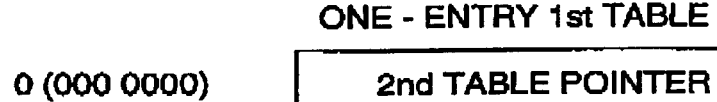
FIG. 15B is a data configuration diagram of a one-entry first table.

As shown in FIG. 15B, in contrast, the one-entry first table 140 has a memory capacity for only one entry. A second table pointer corresponding to a registered address is set as only one entry. By thus providing the one-entry first table 140, the memory capacity can be reduced in the case where the registered entry is one in number per first table.

In the case of the one-entry first table, it is not necessary to make the entry address match the divisional bit string of the registered address.

In the case where the one-entry first table 140 is provided, the fact that the first table 140 is a one-entry first table is indicated by a table type flag of an entry of the second table in which a first table pointer indicating the one-entry first table 140 is set (see an arrow "j" in FIG. 14).

Further, in the registered address and its prefix length field of each of the bit-0 and bit-1 one-entry first tables of that entry, the divisional bit string value and its prefix length of a registered address registered in the single entry of the one-entry first table 140 have been set.

Hop pointer retrieval processing from indicated by the arrow a to the arrow j of FIG. 14. In the second embodiment is the same as that of the first embodiment. Since the table type flag indicates that the first table is the one-entry first table 140 in the entry of the second table indicated by the arrow j in FIG. 14, the following processing is performed.

In the same way as the stop S108 or S111 of FIG. 10, the second control section 60 reads out a prefix length from the field 26 or 29 of the entry. The second control section 60 determines whether the portion having the prefix length from the highest order of the divisional bit string value of that stage matches the divisional bit string value of the registered address corresponding to the one-entry first table (step S108 or S111 of FIG. 10).

When they are matched (YES in step S108 or S110), the second control section 60 sends the first table pointer to the first control section so (step S112 of FIG. 10). The first control section 50 accesses the first table (one-entry first table) 140 of the fourth stage indicated by the first table pointer (as indicated by an arrow "k"). Further, the first control section 50 accesses an entry of the second table indicated by a second table pointer in the entry of the one-entry first table 140 (as indicated by an arrow "m"). Subsequently, the first control section 50 reads out a hop pointer of the entry of the second table (as indicated by an arrow "n").

If they are not matched (NO in step S108 or S111), the second control section 60 determines retrieval failure and terminates the retrieval.

THIRD EMBODIMENT

Figure 16:
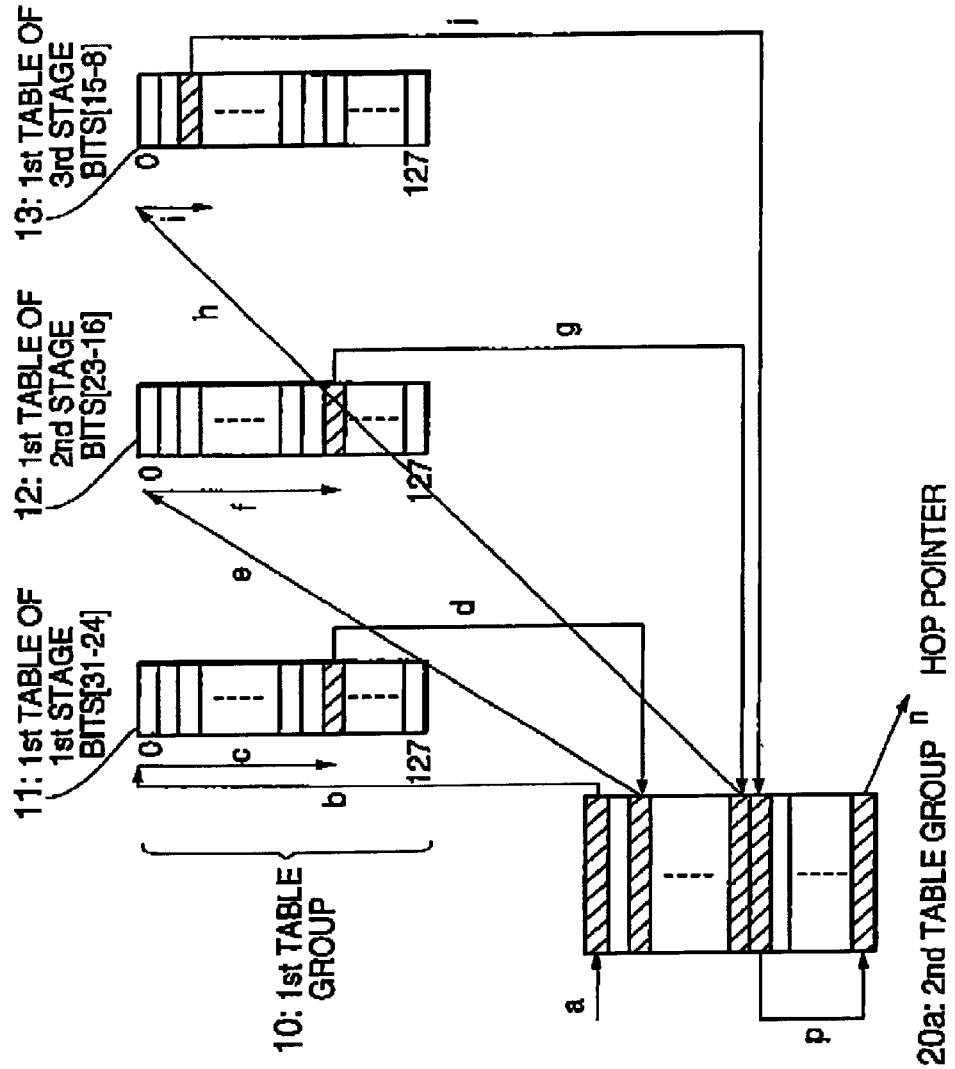
FIG. 16 is a conceptual configuration diagram of retrieval tables showing a forwarding destination retrieval method according to a third embodiment of the present invention.

A third embodiment of the present invention will be described by referring to FIG. 16.

In the above-described second embodiment, the example in which the one-entry first table 140 (FIG. 14) is provided has been described.

In the third embodiment, however, the one-entry first table 140 is omitted. As shown in FIG. 16, in a second table 20a, a second table pointer to be set in the entry of the one-entry first table is set instead of the first table pointer indicating the one-entry first table, which is indicated by an arrow p of FIG. 16.

By doing so, the one-entry first table can be omitted. As a result, the memory capacity can be further saved. In addition. The total number of access times can be reduced by the number of times the omitted first table should be accessed. As a result, the retrieval can be conducted more rapidly.

FOURTH EMBODIMENT

A fourth embodiment of the present invention will be described by referring to FIG. 17.

In the fourth embodiment, an entry of a first table has a second table pointer only when it is necessary to update the hop pointer. In the case where updating is not necessary, the entry has a first table pointer indicating a first table of the next stage to be subsequently accessed according to the bit string value of a registered address, instead of the second table pointer.

Figure 17:
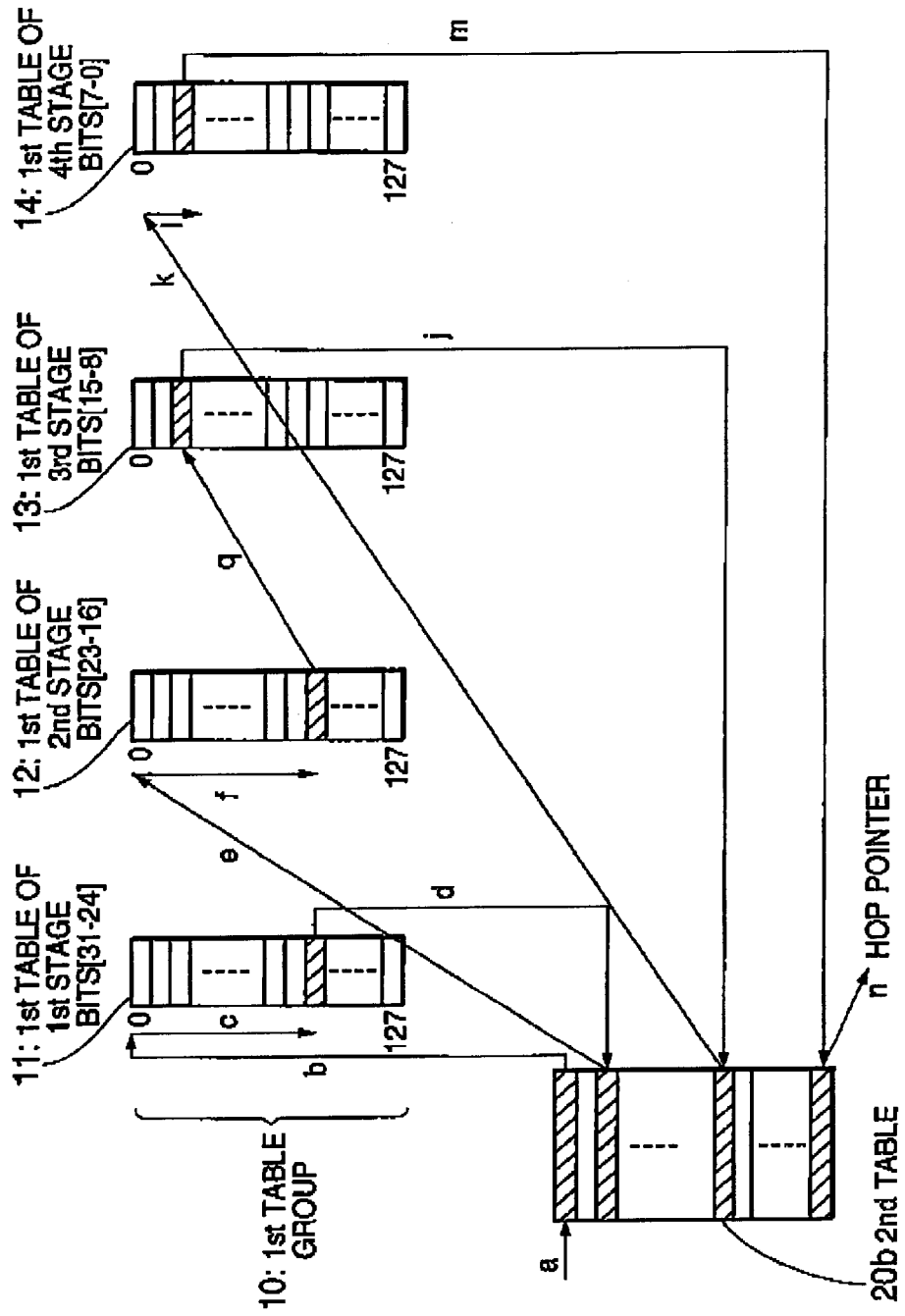
FIG. 17 is a conceptual configuration diagram of retrieval tables showing a forwarding destination retrieval method according to a fourth embodiment of the present invention.

FIG. 17 shows the case where an entry of the first table 12 of the second stage has a first table pointer instead of the second table pointer. Each of entries of the first tables 11, 13 and 14 of other stages has a second table pointer.

In retrieving the hop pointer, access to the first table 13 of the third stage is directly conducted from the first table 12 of the second stage without intervention of the second table (as indicated by an arrow "q" in FIG. 17).

In the case where the update flag does not indicate updating, a table pointer indicating the first table of the next stage is thus stored instead of the second table pointer. In this manner, the first table of the next stage can be accessed without accessing the second table 20b. As a result, the number of access times in the retrieval can be reduced, resulting in higher-speed retrieval. In addition, the number of entries of the second table can be reduced by the number of the second table pointers. Accordingly, the memory capacity of the second table can also be saved.

In the above described embodiments, the example in which the present invention is implemented under specific conditions has been described. However, various modifications can be made in the present invention. For example, by taking IPv4 (having a bit length of 32 bits) as an example, the above embodiments have been described. In the case of IPv6 (having a bit length of 128 bits), however, similar advantages are also obtained. The case where IPv4 and IPv6 are mixed can also be coped with by adding a 96-bit string (which is not used in IPv6) to the bit string of IPv4 and thereby making IPv4 as a part of IPv6.

In the case of IPv6, the length of a destination address is 128 bits. In the case of 8-bit first tables, therefore, the configuration has 16 stages at most.

Further, an entry of the second table may be used to share the entry itself between Ipv4 and Ipv6 by adding fields of IPv4 only, IPv6 only, and IPv4/IPv6 common use to the second table entry. In such a case, an IPv4/IPv6 identification flag field may be added to the fields of the second table. Preferably, the identification flag has three values: IPv4 only, IPv6 only, and IPv4/IPv6 common use.

In the above described embodiments, the bit string of a destination address is divided into divisional bit strings each having 8 bits. In the present invention, however, the number of bits of each divisional bit string is not restricted to 8 bits, but may be an arbitrary suitable number.

Further, in the above described embodiments, the number of bits is equal among the divisional bit strings of respective stages. In the present invention, however, the number of bits in a divisional bit string may differ depending on its stage.

In the flow chart as shown in FIG. 10, all items of an entry are read out from the second table, in the retrieval in each of the first to fourth stages, however, the value of Bit(X) is found from a corresponding bit of the destination address. In reading the entry of the second table, therefore, it is also possible to read out only a required portion thereof.

As described above, a second table serving as an index is provided besides hierarchized first tables, in accordance with the present invention. Retrieval is conducted alternately in the first tables and the second table. Hop pointers each indicating next forwarding destinations are stored only in the second table. The first tables have only second table pointers as entries.

As a result, the memory capacity forming each of the first tables can be reduced as compared with the memory capacity of an individual retrieval table. Accordingly, the memory capacity of the retrieval tables as a whole can be saved.

Further, in the present invention, hop pointers are stored only in the second table serving as an index. In alteration of a registered address, therefore, it is sufficient to change only the second table pointer regarding an enormous number of pertinent entries of the first tables. Alteration of information concerning the forwarding destination, such as the hop pointer, can be conducted only in the second table. In the present invention, therefore, registered address alteration can be conducted easily.

What is claimed is:

1. A method for retrieving a hop pointer from a retrieval table using a destination address of a received data signal as a retrieval key to determine a next forwarding destination of the received data signal, the hop pointer indicating a registered address of the next forwarding destination, the method comprising the steps of:

a) providing a plurality of first tables T1_i (i is a positive integer) and a second table T2 in the retrieval table,
   wherein the plurality of first tables are hierarchically divided into a plurality of stages S(j) (j is a positive integer) corresponding to a sequence of divisional bit strings obtained by sequentially dividing a predetermined bit length of the destination address in decreasing order of significance, each of the first tables containing at least one first entry E1_k (k is a positive integer) each having a different offset address numbered based on a corresponding divisional bit string, wherein a first entry having an offset address matching a bit string portion of a registered address corresponding to a stage of each of the first tables includes a second-table pointer,
   wherein the second table has a plurality of second entries E2_m (m is a positive integer), each of which includes a retrieval control flag, a first-table pointer, and a hop pointer, wherein one of the second entries is indicated by a second-table pointer of the first table, wherein the first-table pointer indicates a first table of a stage S(j+1) following a current stage S(j);
b) dividing the destination address into a plurality of destination divisional bit strings DST(j) each corresponding to the stages S(j):
c) accessing a first table T1_1 of the stage S(1) to retrieve a first entry E1_1 using a high-order destination divisional bit string DST(1) corresponding to the stage S(1) as a retrieval key, wherein the first entry E1_1 has an offset address matching the high-order destination divisional bit string DST(1);
d) accessing a second entry E2_1 of the second table T2 according to a second-table pointer included in the first entry E1_1;
e) when a retrieval control flag included in a second entry E2_m indicates continuation of retrieval, accessing a first table T1_i indicated by a first-table pointer included in the second entry E2_m to retrieve a first entry E1_k from the first table T1_i using a destination divisional bit string of a stage corresponding to the first table T1_i as a retrieval key, wherein the first entry E1_k has an offset address matching the destination divisional bit string of a stage corresponding to the first table T1_i;
f) accessing another second entry E2_m of the second table T2 according to a second-table pointer included in the retrieved first entry E1_k;
g) repeating the steps (e) and (f) when a retrieval control flag included in a second entry E2_m indicates continuation of retrieval; and
h) when a retrieval control flag included in a second entry E2_m indicates termination of retrieval, reading a hop pointer included in the second entry E2_m as a retrieval result to terminate the retrieval.

2. The method according to claim 1, wherein a first table in which a least significant bit of a significant bit string of a registered address is located in middle of a corresponding divisional bit string has a second table pointer included in an entry of each of offset addresses including in common a portion of the significant bit string of the registered address of a corresponding stage.

3. The method according to claim 1, wherein each of the second entries of the second table further includes an update flag indicating whether a hop pointer is updated, further comprising the steps of:
   storing an initial hop pointer in a variable;
   in the step (f), when an update flag included in the second entry E2_m indicates updating of a hop pointer, updating the variable to a hop pointer included in the second entry E2_m; and
   in the step (h), when a retrieval control flag included in the second entry E2_m indicates termination of retrieval, reading a hop pointer from the variable as a retrieval result to terminate the retrieval.

4. A method for retrieving a hop pointer from a retrieval table using a destination address of a received data signal as a retrieval key to determine a next forwarding destination of the received data signal, the hop pointer indicating a registered address of the next forwarding destination, the method comprising the steps of;
a) providing a plurality of first tables T1_i (i is a positive integer) and a second table T2 in the retrieval table,
   wherein the plurality of first tables are hierarchically divided into a plurality of stages s(j) (j is a positive integer) corresponding to a sequence of divisional bit strings obtained by sequentially dividing a predetermined bit length of the destination address in decreasing order of significance, each of the first tables containing at least one first entry E1_k (k is a positive integer) each having a different offset address numbered based on a corresponding divisional bit string, wherein a second-table pointer is included in a first entry which has an offset address matching a bit string portion of a registered address corresponding to a stage of each of the first tables when updating a hop pointer is needed, and wherein a first-table pointer indicating a first table of a stage S(j+1) following a current stage S(j) is included in a first entry which has an offset address matching a bit string portion of a registered address corresponding to a stage of each of the first tables when updating a hop pointer is not needed, and
   wherein the second table has a plurality of second entries E2_m (m is a positive integer), each of which includes a retrieval control flag, a first-table pointer, and a hop pointer, wherein one of the second entries is indicated by a second-table pointer of the first table, wherein the first-table pointer indicates a first table of a stage S(j+1) following a current stage S(j);
b) dividing the destination address into a plurality of destination divisional bit strings DST(j) each corresponding to the stages s(j);
c) accessing a first table T1_1 of the stage S(1) to retrieve a first entry E1_1 using a high-order destination divisional bit string DST(1) corresponding to the stage S(1) as a retrieval key, wherein the first entry E1_1 has an offset address matching the high-order destination divisional bit string DST(1);
d) accessing a second entry E2_1 of the second table T2 according to a second-table pointer included in the first entry E1_1;
e) when a retrieval control flag included in a second entry E2_m indicates continuation of retrieval, accessing a first table T1_i indicated by a first-table pointer included in the second entry E2_m to retrieve a first entry E1_k from the first table T1_i using a destination divisional bit string of a stage corresponding to the first table T1_1 as a retrieval key, wherein the first entry E1_k has an offset address matching the destination divisional bit string of a stage corresponding to the first table T1_1:
f) when a retrieved first entry E1_k includes a first-table pointer, directly accessing a first table T1_i indicated by a first-table pointer included in the retrieved first entry E1_k without accessing the second table to retrieve a first entry E1_k from the directly accessed first table T1_k using a destination divisional bit string of a stage corresponding to the directly accessed first table T1_i as a retrieval key;

g) accessing another second entry E2_m of the second table T2 according to a second-table pointer included in the retrieved first entry E1_k;

h) repeating the steps (e) and (g) when a retrieval control flag included in a second entry E2_m indicates continuation of retrieval; and i) when a retrieval control flag included in a second entry E2_m indicates termination of retrieval, reading a hop pointer included in the second entry E2_m as a retrieval result to terminate the retrieval.

5. The method according to claim 4, wherein a first table in which a least significant bit of a significant bit string of a registered address is located in middle of a corresponding divisional bit string has a second table pointer included in an entry of each of offset addresses including in common a portion of the significant bit string of the registered address of a corresponding stage.

6. The method according to claim 4, wherein each of the second entries of the second table further includes an update flag indicating whether a hop pointer is updated, further comprising the steps of:

storing an initial hop pointer in a variable;

in the step (f), when an update flag included in the second entry E2_m indicates updating of a hop pointer, updating the variable to a hop pointer included in the second entry E2_m; and in the step (h), when a retrieval control flag included in the second entry E2_m indicates termination of retrieval, reading a hop pointer from the variable as a retrieval result to terminate the retrieval.

7. The method according to claim 1, wherein each of the first tables is one of a bit-0 first table and a bit-1 first table, when a head bit of a divisional bit string corresponding to the first table is 0, the bit-0 first table corresponds to a remaining divisional bit string obtained by removing the head bit of 0 from the divisional bit string corresponding to the first table, and when a head bit of a divisional bit string corresponding to the first table is 1, the bit-1 first table corresponds to a remaining divisional bit string obtained by removing the head bit of 1 from the divisional bit string corresponding to the first table, wherein each of the second entries of the second table further includes a bit-0 first table pointer and a bit-1 first table pointer, and in the step (e), when a head bit of a corresponding divisional bit string is 0, a bit-0 first table indicated by a bit-0 first table pointer is accessed; and when a head bit of a corresponding divisional bit string is 1, a bit-1 first table indicated by a bit-1 first table pointer is accessed.

8. The method according to claim 4, wherein each of the first tables is one of a bit-0 first table and a bit-1 first table, when a head bit of a divisional bit string corresponding to the first table is 0, the bit-0 first table corresponds to a remaining divisional bit string obtained by removing the head bit of 0 from the divisional bit string corresponding to the first table, and when a head bit of a divisional bit string corresponding to the first table is 1, the bit-1 first table corresponds to a remaining divisional bit string obtained by removing the head bit of 1 from the divisional bit string corresponding to the first table, wherein each of the second entries of the second table further includes a bit-0 first table pointer and a bit-1 first table pointer, and in the steps (e) and (f), when a head bit of a corresponding divisional bit string is 0, a bit-0 first table indicated by a bit-0 first table pointer is accessed; and when a head bit of a corresponding divisional bit string is 1, a bit-1 first table indicated by a bit-1 first table pointer is accessed.

9. The method according to claim 1, wherein when a first table has only one entry corresponding to a divisional bit string portion of the registered address of a corresponding stage, the first table having only one entry is created as a one-entry first table which is a table having only a memory capacity for storing one entry, wherein each of the second entries further includes a table type flag indicating whether a first table indicated by a first table pointer included in the second entry is a one-entry first table, wherein when a table type flag indicates, that a first table T1_i indicated by a first table pointer included in the second entry is a one-entry first table, the divisional bit string portion of the registered address corresponding to the one-entry first table is compared with a significant portion of the destination divisional bit string of a stage corresponding to the one-entry first table, when they are not matched, the retrieval is terminated, and when they are matched, a second entry E2_m of the second table T2 is accessed according to the second-table pointer included in the one-entry first table.

10. The method according to claim 4, wherein when a first table has only one entry corresponding to a divisional bit string portion of the registered address of a corresponding stage, the first table having only one entry is created as a one-entry first table which is a table having only a memory capacity for storing one entry, wherein each of the second entries further includes a table type flag indicating whether a first table indicated by a first table pointer included in the second entry is a one-entry first table, wherein when a table type flag indicates that a first table T1_i indicated by a first table pointer included in the second entry is a one-entry first table, the divisional bit string portion of the registered address corresponding to the one-entry first table is compared with a significant portion of the destination divisional bit string of a stage corresponding to the one-entry first table, when they are not matched, the retrieval is terminated, and when they are matched, a second entry E2_m of the second table T2 is accessed according to the second-table pointer included in the one-entry first table.

11. The method according to claim 1, wherein when a first table has only one entry corresponding to a divisional bit string portion of the registered address of a corresponding stage, the first table having only one entry is omitted and a second-table pointer which should be included in the first table having only one entry is included in the second table in place of a first-table pointer indicating the first table having only one entry.

12. The method according to claim 4, wherein when a first table has only one entry corresponding to a divisional bit string portion of the registered address of a corresponding stage, the first table having only one entry is omitted and a second-table pointer which should be included in the first table having only one entry is included in the second table in place of a first-table pointer indicating the first table having only one entry.

13. The method according to claim 1, wherein a head second entry E2__1 of the second table includes a first-table pointer indicating the first table T1__1 corresponding to the stage S(1), wherein when starting the retrieval, the head second entry E2__1 is accessed and then the first table T1__1 is accessed according to the first-table pointer included in the head second entry E2__1.

14. The method according to claim 4, wherein a head second entry E2__1 of the second table includes a first-table pointer indicating the first table T1__1 corresponding to the stage S(1), wherein when starting the retrieval, the head second entry E2__1 is accessed and then the first table T1__1 is accessed according to the first-table pointer included in the head second entry E2__1.

15. The method according to claim 1, wherein the retrieval table is changed by changing a first-table pointer and a hop pointer in a desired second entry of the second table and changing a second-table pointer in a desired first entry of a desired first table.

16. The method according to claim 4, wherein the retrieval table is changed by changing a first-table pointer and a hop pointer in a desired second entry of the second table and changing a second-table pointer in a desired first entry of a desired first table.

17. A retrieval apparatus for retrieving a hop pointer from a retrieval table using a destination address of a received data signal as a retrieval key to determine a next forwarding destination of the received data signal, the hop pointer indicating a registered address of the next forwarding destination, comprising:

a first storage section for storing a plurality of first tables T1__i (i is a positive integer);

a second storage section for storing a second table T2;

a first control section for controlling access to the first storage section; and a second control section for controlling access to the second storage section, wherein the plurality of first tables are hierarchically divided into a plurality of stages S(j) (j is a positive integer) corresponding to a sequence of divisional bit strings obtained by sequentially dividing a predetermined bit length of the destination address in decreasing order of significance, each of the first tables containing at least one first entry E1__k (k is a positive integer) each having a different offset address numbered based on a corresponding divisional bit string, wherein a first entry having an offset address matching a bit string portion of a registered address corresponding to a stage of each of the first tables includes a second-table pointer, wherein the second table has a plurality of second entries E2__m (m is a positive integer), each of which includes a retrieval control flag, a first-table pointer, and a hop pointer, wherein one of the second entries is indicated by a second-table pointer of the first table, wherein the first-table pointer indicates a first table of a stage S(j+1) following a current stage S(j), the second control section divides the destination address into a plurality of destination divisional bit strings DST(j) each corresponding to the stages S(j) and sequentially sends the destination divisional bit strings DST(j) to the first control section, the first control section accesses a first table T1__1 of the stage S(1) to retrieve a first entry E1__1 using a high-order destination divisional bit string DST(1) corresponding to the stage S(1) as a retrieval key, wherein the first entry E1__1 has an offset address matching the high-order destination divisional bit string DST(1), and sends a second-table pointer included in the first entry E1__1 to the second control section, the second control section accesses a second entry E2__1 of the second table T2 according to the second-table pointer received from the first control section and, when a retrieval control flag included in a second entry E2__m indicates continuation of retrieval, sends a first-table pointer included in the second entry E2__m to the first control section, the first control section accesses a first table T1__i indicated by the first-table pointer received from the second control section, retrieves a first entry E1__k from the first table T1__i using a destination divisional bit string of a stage corresponding to the first table T1__i as a retrieval key, wherein the first entry E1__k has an offset address matching the destination divisional bit string of a stage corresponding to the first table T1__i, and sends a second-table pointer included in the retrieved first entry E1__k to the second control section, and the second control section accesses another second entry E2__m of the second table T2 according to the second-table pointer received from the first control section, wherein when a retrieval control flag included in a second entry E2__m indicates continuation of retrieval, the first control section repeatedly reads a second-table pointer from a first entry having an offset address matching the destination divisional bit string of a corresponding stage, and sends the read second-table pointer to the second control section and, when a retrieval control flag included in a second entry E2__m indicates termination of retrieval, the second control section reads a hop pointer included in the second entry E2__m as a retrieval result to terminate the retrieval.

18. The retrieval apparatus according to claim 17, wherein a first table in which a least significant bit of a significant bit string of a registered address is located in middle of a corresponding divisional bit string has a second table pointer included in an entry of each of offset addresses including in common a portion of the significant bit string of the registered address of a corresponding stage.

19. The retrieval apparatus according to claim 17, wherein each of the second entries of the second table further includes an update flag indicating whether a hop pointer is updated, wherein the second control section stores an initial hop pointer in a variable and, when an update flag included in the second entry E2__m indicates updating of a hop pointer, updates the variable to a hop pointer included in the second entry E2__m, wherein when a retrieval control flag included in the second entry E2__m indicates termination of retrieval the second control section reads a hop pointer from the variable as a retrieval result to terminate the retrieval.

20. A retrieval apparatus for retrieving a hop pointer from a retrieval table using a destination address of a received data signal as a retrieval key to determine a next forwarding destination of the received data signal, the hop pointer indicating a registered address of the next forwarding destination, comprising:

a first storage section for storing a plurality of first tables T1__i (i is a positive integer);

a second storage section for storing a second table T2;

a first control section for controlling access to the first storage section; and a second control section for controlling access to the second storage section, wherein the plurality of first tables are hierarchically divided into a plurality of stages S(j) (j is a positive integer) corresponding to a sequence of divisional bit strings obtained by sequentially dividing a predetermined bit length of the destination address in decreasing order of significance, each of the first tables containing at least one first entry E1__k (k is a positive integer) each having a different offset address numbered based on a corresponding divisional bit string, wherein a second-table pointer is included in a first entry which has an offset address matching a bit string portion of a registered address corresponding to a stage of each of the first tables when updating a hop pointer is needed, and wherein a first-table pointer indicating a first table of a stage S(j+i) following a current stage S(j) is included in a first entry which has an offset address matching a bit string portion of a registered address corresponding to a stage of each of the first tables when updating a hop pointer is not needed, wherein the second table has a plurality of second entries E2__m (m is a positive integer), each of which includes a retrieval control flag, a first-table pointer, and a hop pointer, wherein one of the second entries is indicated by a second-table pointer of the first table, wherein the first-table pointer indicates a first table of a stage S(j+1) following a current stage S(j), the second control section divides the destination address into a plurality of destination divisional bit strings DST(j) each corresponding to the stages S(j) and sequentially sends the destination divisional bit strings DST(j) to the first control section, the first accesses a first table T1__1 of the stage S(1) to retrieve a first entry R1 is using a high-order destination divisional bit string DST(1) corresponding to the stage S(1) as a retrieval key, wherein the first entry E1__1 has an offset address matching the high-order destination divisional bit string DST(1), and sends a second-table pointer included in the first entry E1__1 to the second control section, the second control section accesses a second entry E2__1 of the second table T2 according to the second-table pointer received from the first control section, when a retrieval control flag included in a second entry E2__m indicates continuation of retrieval, the first control section accesses a first table T1__i indicated by a first-table pointer included in the second entry E2__m to retrieve a first entry E1__k from the first table T1__1 using a destination divisional bit string of a stage corresponding to the first table T1__i as a retrieval key, wherein the first entry E1__k has an offset address matching the destination divisional bit string of a stage corresponding to the first table T1__i, and sends a second-table pointer included in the retrieved first entry E1__k to the second control section, when a retrieved first entry E1__k includes a first-table pointer, the first control section directly accesses a first table T1__i indicated by a first-table pointer included in the retrieved first entry E1__k without accessing the second table to retrieve a first entry E1__k from the directly accessed first table T1__k using a destination divisional bit string of a stage corresponding to the directly accessed first table T1__1 as a retrieval key, and sends a second-table pointer included in the retrieved first entry E1__k to the second control section.

the second control section accesses another second entry E2__m of the second table T2 according to the second-table pointer received from the first control section, wherein when a retrieval control flag included in a second entry E2__m indicates continuation of retrieval, the first control section repeatedly reads a second-table pointer from a first entry having an offset address matching the destination divisional bit string of a corresponding stage, and sends the read second-table pointer to the second control section and, when a retrieval control flag included in a second entry E2__m indicates termination of retrieval, the second control section reads a hop pointer included in the second entry E2__m as a retrieval result to terminate the retrieval.

21. A recording medium storing a retrieval table which is used in a network node to retrieve a hop pointer using a destination address of a received data signal as a retrieval key to determine a next forwarding destination of the received data signal, the hop pointer indicating a registered address of the next forwarding destination, the retrieval table comprising a plurality of first tables T1__i (i is a positive integer) and a second table T2, wherein the plurality of first tables are hierarchically divided into a plurality of stages S(j) (j is a positive integer) corresponding to a sequence of divisional bit strings obtained by sequentially dividing a predetermined bit length of the destination address in decreasing order of significance, each of the first tables containing at least one first entry E1__k (k is a positive integer) each having a different offset address numbered based on a corresponding divisional bit string, wherein a first entry having an offset address matching a bit string portion of a registered address corresponding to a stage of each of the first tables includes a second-table pointer and wherein the second table has a plurality of second entries E2__m (m is a positive integer), each of which includes a retrieval control flag, a first-table pointer, and a hop pointer, wherein one of the second entries is indicated by a second-table pointer of the first table, wherein the first-table pointer indicates a first table of a stage S(j+1) following a current stage S(j).

22. A recording medium storing a retrieval table which is used in a network node to retrieve a hop pointer using a destination address of a received data signal as a retrieval key to determine a next forwarding destination of the received data signal, the hop pointer indicating a registered address of the next forwarding destination, the retrieval table comprising a plurality of first tables T1__i (i is a positive integer) and a second table T2, wherein the plurality of first tables are hierarchically divided into a plurality of stages S(j) (j is a positive integer) corresponding to a sequence of divisional bit strings obtained by sequentially dividing a predetermined bit length of the destination address in decreasing order of significance, each of the first tables containing at least one first entry E1_k (k is a positive integer) each having a different offset address numbered based on a corresponding divisional bit string, wherein a second-table pointer is included in a first entry which has an offset address matching a bit string portion of a registered address corresponding to a stage of each of the first tables when updating a hop pointer is needed, and wherein a first-table pointer indicating a first table of a stage S(j+1) following a current stage S(j) is included in a first entry which has an offset address matching a bit string portion of a registered address corresponding to a stage of each of the first tables when updating a hop pointer is not needed, and wherein the second table has a plurality of second entries E2_m (m is a positive integer), each of which includes a retrieval control flag, a first-table pointer, and a hop pointer, wherein one of the second entries is indicated by a second-table pointer of the first table, wherein the first-table pointer indicates a first table of a stage S(j+1) following a current stage S(j).

23. A recording medium storing a retrieval program to be executed by a computer in a network node to retrieve a hop pointer from a retrieval table using a destination address of a received data signal as a retrieval key to determine a next forwarding destination of the received data signal, the hop pointer indicating a registered address of the next forwarding destination, the retrieval program comprising the steps of:

a) providing a plurality of first tables T1_i (i is a positive integer) and a second table T2 in the retrieval table, wherein the plurality of first tables are hierarchically divided into a plurality of stages S(j) (j is a positive integer) corresponding to a sequence of divisional bit strings obtained by sequentially dividing a predetermined bit length of the destination address in decreasing order of significance, each of the first tables containing at least one first entry E1_k (k is a positive integer) each having a different offset address numbered based on a corresponding divisional bit string, wherein a first entry having an offset address matching a bit string portion of a registered address corresponding to a stage of each of the first tables includes a second-table pointer.

wherein the second table has a plurality of second entries E2_m (m is a positive integer), each of which includes a retrieval control flag, a first-table pointer, and a hop pointer, wherein one of the second entries is indicated by a second-table pointer of the first table, wherein the first-stable pointer indicates a first table of a stage S(j+1) following a current stage S(j);

b) dividing the destination address into a plurality of destination divisional bit strings DST(j) each corresponding to the stages S(j);

c) accessing a first table T1_1 of the stage S(1) to retrieve a first entry E1_1 using a high-order destination divisional bit string DST(L) corresponding to the stage S(1) as a retrieval key, wherein the first entry E1_1 has an offset address matching the high-order destination divisional bit string DST(1);

d) accessing a second entry E2_1 of the second table T2 according to a second-table pointer included in the first entry E1_1, e) when a retrieval control flag included in a second entry E2_m indicates continuation of retrieval, accessing a first-table T1_1 indicated by a first-table pointer included in the second entry E2_m to retrieve a first entry E1_k from the first table T1_i using a destination divisional bit string of a stage corresponding to the;first table T1_i as a retrieval key, wherein the first entry E1_k has an offset address matching the destination divisional bit string of a stage corresponding to the first table T1_i:

f) accessing another second entry E2_m of the second table T2 according to a second-table pointer included in the retrieved first entry E1_k;

g) repeating the steps (e) and (f) when a retrieval control flag included in a second entry E2_m indicates continuation of retrieval; and h) when a retrieval control flag included in a second entry E2_m indicates termination of retrieval, reading a hop pointer included in the second entry E2_m as a retrieval result to terminate the retrieval.

24. A recording medium storing a retrieval program to be executed by a computer in a network node to retrieve a hop pointer from a retrieval table using a destination address of a received data signal as a retrieval key to determine a next forwarding destination of the received data signal, the hop pointer indicating a registered address of the next forwarding destination, the retrieval program comprising the steps of:

a) providing a plurality of first tables T1_i (i is a positive integer) and a second table T2 in the retrieval table, wherein the plurality of first tables are hierarchically divided into a plurality of stages S(j) (j is a positive integer) corresponding to a sequence of divisional bit strings obtained by sequentially dividing a predetermined bit length of the destination address in decreasing order of significance, each of the first tables containing at least one first entry E1_k (k is a positive integer) each having a different offset address numbered based on a corresponding divisional bit string, wherein a second-table pointer is included in a first entry which has an offset address matching a bit string portion of a registered address corresponding to a stage of each of the first tables when updating a hop pointer is needed, and wherein a first-table pointer indicating a first table of a stage S(j+1) following a current stage S(j) is included in a first entry which has an offset address matching a bit string portion of a registered address corresponding to a stage of each of the first tables when updating a hop pointer is not needed, and wherein the second table has a plurality of second entries E2_m (m is a positive integer), each of which includes a retrieval control flag, a first-table pointer, and a hop pointer, wherein one of the second entries is indicated by a second-table pointer of the first table, wherein the first-table pointer indicates a first table of a stage S(j+1) following a current stage S(j);

b) dividing the destination address into a plurality of destination divisional bit strings DST(j) each corresponding to the stages S(j);

c) accessing a first table T1_1 of the stage S(1) to retrieve a first entry E1_1 using a high-order destination divisional bit string DST(1) corresponding to the stage S(1) as a retrieval key, wherein the first entry E1_1 has an offset address matching the high-order destination divisional bit string DST(1);

d) accessing a second entry E2_1 of the second table T2 according to a second-table pointer included in the first entry E1_1;

e) when a retrieval control flag included in a second entry E2_m indicates continuation of retrieval, accessing a first table T1_i indicated by a first-table pointer included in the second entry E2_m to retrieve a first entry E1_k from the first table T1_i using a destination divisional bit string of a stage corresponding to the first table T1_i as a retrieval key, wherein the first entry E1_k has an offset address matching the destination divisional bit string of a stage corresponding to the first table T1_i;

f) when a retrieved first entry E1_k includes a first-table pointer, directly accessing a first table T1_i indicated by a first-table pointer included in the retrieved first entry E1_k without accessing the second table to retrieve a first entry E1_k from the directly accessed first table T1_k using a destination divisional bit string of a stage corresponding to the directly accessed first table T1_i as a retrieval key;

g) accessing another second entry E2_m of the second table T2 according to a second-table pointer included in the retrieved first entry E1_ks;

h) repeating the steps (e) and (g) when a retrieval control flag included in a second entry E2_m indicates continuation of retrieval; and i) when a retrieval control flag included in a second entry E2_m indicates termination of retrieval, reading a hop pointer included in the second entry E2_m as a retrieval result to terminate the retrieval.

25. A method for retrieving a hop pointer from a retrieval table using a destination address of a received data signal as a retrieval key to determine a next forwarding destination of the received data signal, the hop pointer indicating a registered address of the next forwarding destination, the method comprising the steps of:

a) storing a plurality of first tables and a second table in the retrieval table,
   wherein the first tables are hierarchically arranged according to division of the destination address, an entry of each of the first tables including a second-table pointer indicating a next accessed second entry of the second table, and
   wherein the second table serves as an index table of the first tables, wherein each of entries of the second table includes a hop pointer and a first-table pointer indicating a next accessed first table;

b) alternately accessing the second table and a selected one of the first tables depending on a first-table pointer included in an accessed entry of the second table while retrieving an entry of an accessed first table using a corresponding divisional portion of the destination address; and c) reading a hop pointer from a finally accessed entry of the second table as a retrieval result.

* * * * *